(12) United States Patent
Tian et al.

(10) Patent No.: US 11,461,100 B2
(45) Date of Patent: Oct. 4, 2022

(54) PROCESS ADDRESS SPACE IDENTIFIER VIRTUALIZATION USING HARDWARE PAGING HINT

(71) Applicant: Intel Corporation, Santa Clara, CA (US)

(72) Inventors: Kun Tian, Shanghai (CN); Sanjay Kumar, Hillsboro, OR (US); Ashok Raj, Portland, OR (US); Yi Liu, Beijing (CN); Rajesh M. Sankaran, Portland, OR (US); Philip R. Lantz, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/253,053

(22) PCT Filed: Dec. 21, 2018

(86) PCT No.: PCT/CN2018/122529
§ 371 (c)(1),
(2) Date: Dec. 16, 2020

(87) PCT Pub. No.: WO2020/124519
PCT Pub. Date: Jun. 25, 2020

(65) Prior Publication Data
US 2021/0271481 A1 Sep. 2, 2021

(51) Int. Cl.
*G06F 9/34* (2018.01)
*G06F 9/38* (2018.01)
(Continued)

(52) U.S. Cl.
CPC .............. *G06F 9/34* (2013.01); *G06F 9/3836* (2013.01); *G06F 9/45558* (2013.01);
(Continued)

(58) Field of Classification Search
CPC ...... G06F 9/34; G06F 9/3836; G06F 9/45558; G06F 12/1009; G06F 13/4221;
(Continued)

(56) References Cited

U.S. PATENT DOCUMENTS

| 5,535,352 A * | 7/1996 | Bridges | ................... G06F 13/28 711/208 |
| 2009/0172314 A1* | 7/2009 | Gabor | ................. G06F 12/0888 711/159 |

(Continued)

FOREIGN PATENT DOCUMENTS

| CN | qq | 9/2017 |
| WO | 2017/123369 A1 | 7/2017 |
| WO | 2018/152688 A1 | 8/2018 |

OTHER PUBLICATIONS

International Preliminary Reporton Patentability, PCT App. No. PCT/CN2018/122529, dated Jul. 1, 2021, 06 pages.
(Continued)

*Primary Examiner* — Farley Abad
(74) *Attorney, Agent, or Firm* — Nicholson De Vos Webster & Elliott LLP

(57) ABSTRACT

Process address space identifier virtualization uses hardware paging hint. The processing device (100) comprising: a processing core (110); and a translation circuit coupled to the processing core, the translation circuit to: receive a workload instruction from a guest application being executed by the processing device, the workload instruction comprising an untranslated guest process address space identifier (gPASID), a workload for an input/output (I/O) target device, and an identifier of a submission register on the I/O target device (410), access a paging data structure (PDS) associated with the guest application to retrieve a page table entry corresponding to the gPASID and the identifier of the submission register (420), determine a value
(Continued)

of an I/O hint bit of the page table entry corresponding to the gPASID and the identifier of the submission register (430), responsive to determining that the I/O hint bit is enabled, keep the untranslated gPASID in the workload instruction (440), and provide the workload instruction to a work queue of the I/O target device (450).

20 Claims, 14 Drawing Sheets

(51) Int. Cl.
    *G06F 9/455*      (2018.01)
    *G06F 12/1009*      (2016.01)
    *G06F 13/42*      (2006.01)

(52) U.S. Cl.
    CPC ...... *G06F 12/1009* (2013.01); *G06F 13/4221* (2013.01); *G06F 2009/45579* (2013.01); *G06F 2009/45583* (2013.01); *G06F 2212/657* (2013.01); *G06F 2213/0024* (2013.01)

(58) Field of Classification Search
    CPC . G06F 2009/45579; G06F 2009/45583; G06F 2212/657; G06F 2213/0024; G06F 2212/1016; G06F 2212/151; G06F 2212/6028; G06F 2212/651; G06F 12/1081; G06F 12/1036

See application file for complete search history.

(56) References Cited

U.S. PATENT DOCUMENTS

| | | |
|---|---|---|
| 2012/0246381 A1 | 9/2012 | Kegel et al. |
| 2016/0350222 A1* | 12/2016 | Podaima ............... G06F 12/109 |
| 2017/0192904 A1 | 7/2017 | Grochowski et al. |
| 2017/0344489 A1* | 11/2017 | Kapoor ............... G06F 12/1027 |
| 2018/0011651 A1* | 1/2018 | Sankaran ............ G06F 12/1009 |

OTHER PUBLICATIONS

International Search Report and Written Opinion, PCT App. No. PCT/CN2018/122529, dated Sep. 19, 2019, 10 pages.

Supplementary European Search Report and Search Opinion, EP App. No. 18944005.0, dated Jun. 9, 2022, 10 pages.

\* cited by examiner

PROCESS ADDRESS SPACE IDENTIFIER VIRTUALIZATION USING HARDWARE PAGING HINT

TECHNICAL FIELD

The present disclosure pertains generally to virtualization within microprocessors, and more specifically, but without limitation, to process address space identifier virtualization using hardware paging hint.

BACKGROUND

Virtualization allows the creation of multiple simulated environments, operating systems (OS), or dedicated resources from a single, physical hardware system. Virtualization is implemented by using software, such as a virtual machine monitor (VMM) or hypervisor (e.g. such as Kernel-based virtual machine (KVM), Xen, VMware ESXI), to present to each OS a "guest" or virtual machine (VM). The VM is a portion of software that, when executed on appropriate hardware, creates an environment allowing the abstraction of an actual physical computer system also referred to as a "host" or "host machine." On the host machine, the virtual machine monitor provides a variety of functions for the VMs, such as allocating and executing request by the virtual machines for the various resources of the host machine.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
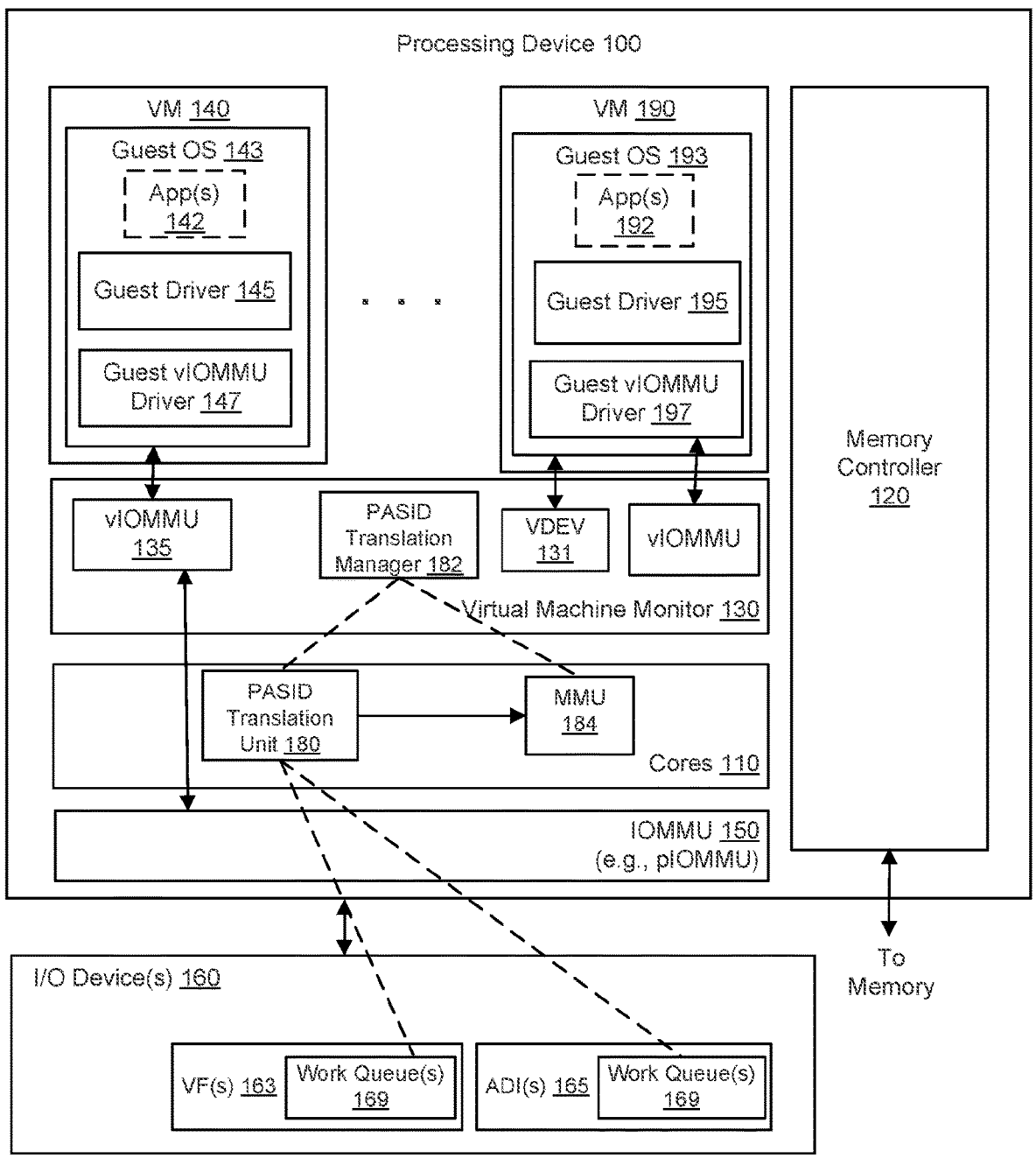
FIG. 1 illustrates a block diagram of a processing device to support process address space identifier virtualization using hardware paging hint, according to one embodiment.

Described herein are methods and systems for process address space identifier virtualization using hardware paging hint. In embodiments of the present disclosure, virtualization is performed for process address space identifiers (PASIDs) across different I/O device interfaces by introducing an input/output (I/O) I/O hint bit in the CPU page table.

In some embodiments, the systems and methods described herein may use Peripheral Component Interconnect (PCI) PASIDs associated with certain I/O devices. It is envisioned that the systems and methods of the present disclosure may be used with other types of address space ID implemented by various I/O devices. In addition, although the disclosure refers to a virtual machine (VM) and virtual machine manager (VMM), the systems and methods discussed herein apply equally to containers and other types of host software virtualization systems as well as hardware assisted virtualization.

Shared virtual memory (SVM) allows for fast accelerator input/output (I/O) devices (e.g., graphics and field programmable gate array (FPGA)) to be directly controlled by user space processes. In implementations, a process address space identifier (PASID) is used in SVM-capable Peripheral Component Interconnect Express (PCI-e®) devices. For example, an I/O memory management unit (IOMMU) may further use the PASID information, which is embedded in a direct memory access (DMA) request out of the SVM-capable device, to assist address translation before forwarding the DMA request to memory controller. The IOMMU could support multiple address translation structures (thus multiple address spaces) on an SVM-capable PCI device. The translation structures are indexed by a PASID received in a direct memory access (DMA) request.

System software (e.g., the operating system or the hypervisor) may share page tables with the IOMMU (each page table associated with a PASID) so that a virtual address (VA) may be used directly in workload requests submitted to the device. A workload is a request made by users or applications to the device to perform a specific function or task. The device tags associate a PASID to every DMA request which is generated when processing the submitted workload request. Upon receiving certain information (e.g., the bus number, device number and function number (BDF), PASID, virtual address (VA)) in DMA request, the IOMMU uses the BDF to locate a device-specific context entry, a PASID for the PASID entry on that device, and then walks through the shared CPU page table (pointed by PASID entry) to get the physical address (PA). Finally, the VA received in DMA request is translated to PA by IOMMU and then forwarded to a memory controller. With the introduction of SVM, applications may directly submit workloads to the device using CPU virtual address, which bypasses unnecessary overhead in kernel device driver and thus may greatly improve the performance.

To submit workloads to the SVM-capable devices, two types of submission modes are supported in SVM implementations, i.e., a dedicated work queue (DWQ) and a shared work queue (SWQ). A DWQ is dedicated for the use by one software entity, such as an application process (either on bare metal, or within a VM). Each DWQ is associated with a PASID field, which is usually programmed (e.g. in a memory-mapped I/O (MMIO) register) by a device driver before the software entity starts workload submissions. Upon workload submitted on DWQ, the device reads the PASID from a corresponding register and then puts it in an outgoing DMA request. A SWQ may be used by more than one software entity simultaneously. For example, when multiple applications may submit work to the same SWQ using certain CPU instructions, for each workload submitted, both the PASID and the workload request are directly included in the instruction payload. The PASID value may be derived from a CPU model-specific register (MSR), or explicitly provisioned as one instruction operand. Upon workload submission on SWQ, the device reads the PASID directly from the instruction payload handle in the requested workload, and then puts the PASID in any outgoing DMA request belonging to the workload being processed.

In virtualized environments, SVM may also be supported when a SVM-capable device is assigned to a VM. For example, the device could be either a PCI endpoint device (Physical Function (PF)), or a Virtual Function (VF), if it self-virtualizes into multiple VFs following PCISIG Single Root I/O Virtualization (SR-IOV). In this type of environment, the IOMMU implements a nested table configuration, where two-level translations are enabled to first translate guest virtual address (GVA) to guest physical address (GPA), and then from GPA to a host physical address (HPA). In some implementations, the PASID is used to support translation of GVA into HPA of the host machine for the SVM scalable devices. For example, the PASID sent with the DMA request from the I/O device may be used as an index into a PASID table to identify the first-level translation structure (GVA→GPA). In some implementations, the PASID table pointer in context entry is treated as a GPA, which also needs to go through the second-level translation to HPA. In such a case, the PASID table (and associated PASID address space) may be directly provisioned by the VM, since it is part of the assigned device resources. In some implementations, the hypervisor exposes a virtual IOMMU to the VM, so guest PASID (gPASID) table may be retrieved and then programmed to the physical IOMMU. Once gPASID table is hooked to the IOMMU, guest software may start workload submissions (either DWQ or SWQ) that include the gPASID and follow device specifications without hypervisor intervention.

In Scalable I/O Virtualization (Scalable IOV), the I/O device implements a hosting function (similar to a PF) and multiple assignable device interfaces (ADIs). In this type of implementation, the PASID is extended to support broader usages, by the IOMMU, to translate a guest physical address (GPA), guest I/O virtual address (GIOVA), or guest virtual address (GVA) into a host physical address (HPA) of the host machine. A key concept is the implementation of an assignable device interface (ADI), which a much more lightweight version of VF that may be directly assigned to a VM. Each ADI contains one or multiple 4 KB pages of MMIO registers for fast data-path submission (e.g., frequent data path accesses that are performance critical) that may be accessed directly from the VM, but typically most slow control-path resources are absent (e.g. PCI configuration space, VF MMIO BAR, PCI MSI-X table, etc.) The system software (e.g., the hypervisor) composites the ADIs into a virtual device (VDEV) and configures the VM access policy on VDEV resources. From VM point of view, the VDEV behaves like a normal PCI endpoint device. In some implementations, fast data-path accesses from the VM are passed through to ADIs, while slow control-path accesses (e.g., infrequent accesses not performance critical) are fully trap-and-emulated by the system software. By moving composition complexity from device to system software, Scalable IOV reduces the hardware complexity while providing better scalability and composability than PCI SR-IOV.

As all ADIs share the same BDF of the hosting function, Scalable IOV utilizes the PASID to distinguish ADIs from each other, regardless of whether the ADI is performing non-SVM or SVM transaction. Thus, the PASID becomes manageable by system software, which leads to the concept of translation between two PASID spaces, such as from a guest PASID (gPASID) space to host PASID (hPASID) space, because the guest PASID cannot be directly used by IOMMU in such situations. For DWQ submissions, the interface of programming the PASID falls into the concept of slow-control path operations and thus is trap-and-emulated by system software. The system software translates a captured guest PASID to a host PASID which is then programmed to the I/O device. For SWQ submissions, a PASID translation structure residing within a virtual machine control structure (VMCS) is used. The VMCS is stored in a region of memory and contains, for example, state of the guest, state of the VMM, and control information indicating under which conditions the VMM wishes to regain control during guest execution. The VMCS PASID translation structure is used to translate the gPASID to an hPASID before the workload submission instruction goes out to the bus. This is so the device will always receive the hPASID consistently. In such a configuration, an hPASID table in the IOMMU is managed by system software and the PASID field on the PCI wire is always the host PASID.

There are, however, several issues that may occur when there is mixed DWQ/SWQ usage on multiple SVM-capable I/O devices which are assigned to the same VM. For example, if one or more assignable device interfaces (ADIs) of a device supporting scalable IOV is assigned to the VM, a host PASID is always expected on the wire as aforementioned. In such case, VMCS PASID translation capability may be enabled to translate gPASID to hPASID for workload submission instructions in the VM. Additionally, one physical function (PF) or one virtual function (VF) of another device supporting SR-IOV may also be assigned to the same VM. In such cases, for a DWQ path on an assigned PF/VF, the guest PASID is observed on the PCI bus due to the guest programming of the PASID (thru MMIO registers), which is passed through to the device without VMM intervention. In another instance, for a SWQ path on the same assigned PF/VF, a host PASID is observed on the PCI bus because the VMCS PASID translation takes effects for all workload submission instructions in the VM, regardless of whether the instruction targets PF/VF or ADI. Due to the mixed DWQ/SWQ usage on the PCI bus, a PASID space conflict (gPASID vs. hPASID) may occur on the assigned PF/VF as one device may be linked to only one PASID table (thus utilizing one PASID name space) in the IOMMU. As such, there is no way to differentiate in the IOMMU whether the received PASID should be treated as a guest PASID or a host PASID for given PF/VF. This confusion may cause a fatal system runtime error or other types of abnormal and unexpected system behavior.

Conventional systems for enabling mixed DWQ/SWQ usage on multiple I/O devices assigned to the same VM fail to efficiently address the above-described issue without having to make additional modifications to the I/O devices or to incur software complexities.

Embodiments of the present disclosure address the above-mentioned and other deficiencies by providing a mechanism to bypass PASID translation when executing a workload submission instruction based on the type of work queue used and the type of the I/O device interface. The decision to bypass PASID translation is made based on the value of an I/O hint bit that is set by the hypervisor in a CPU page table entry when the device is assigned to the VM. The I/O hint bit may be represented by one of the unused reserved bits of a CPU page table entry. In one example, the CPU page table may be represented by the Extended Page Table (EPT) managed by the hypervisor, and the I/O hint bit may be represented by bit 62 of an EPT entry, currently defined as reserved. A PASID translation unit may bypass PASID translation when executing a workload submission instruction based on the type of work queue used and the type of the I/O device interface, as determined by the value of the I/O hint bit. For example, the PASID translation unit may be used to translate a guest PASID in the workload instruction to a host PASID in order for it to be used by an ADI SWQ device (e.g., I/O device). In another example, the PASID translation unit may indicate to bypass the translation of the guest PASID so that the guest PASID may be used by a PF/VF SWQ device.

In accordance with embodiments of the disclosure, the hypervisor may set the value of the I/O hint bit in the CPU page table entry corresponding to the PASID when assigning an I/O device to the VM. If Scalable-IOV is enabled, the hypervisor may set the I/O hint bit to a pre-defined value (e.g. 0), indicating that PASID translation should be executed. If Scalable-IOV is disabled, then the I/O device (being a PF or VF) may use the untranslated PASID on the workload instruction for all DMA transactions. In this case, the hypervisor may set the I/O hint bit to a pre-defined value (e.g. 1), indicating that PASID translation should be bypassed. Under the present disclosure, PF/VF devices may use the gPASID in DMA transactions, and IOMMU context entry may point to gPASID table. Assigned ADI devices on the other hand may use the hPASID in DMA transactions, and IOMMU context entry may point to hPASID table as required by Scalable IOV. As such, implementations of the disclosure facilitate scalability of computer systems by providing process address space identifier virtualization across different I/O device interfaces using hardware paging hint.

FIG. 1 illustrates a block diagram of a processing device 100 for supporting address space identifier management in complex input/output virtualization environments according to one embodiment. The processing device 100 may be generally referred to as "processor" or "CPU". "Processor" or "CPU" herein shall refer to a device that is capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110 and a memory controller unit 120, among other components, coupled to each other as shown. The processing device 100 may also include a communication bus (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system. In one embodiment, the SoC may comprise processing device 100 and a memory (not shown). The memory may be located on the same chip as the processor and other system components. Additionally, other logic blocks such as a memory controller or graphics controller may also be located on the chip.

In an illustrative example, processing core 110 may have a micro-architecture including processor logic and circuits. Processor cores with different micro-architectures may share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file). The processor core(s) 110 may execute instructions for the processing device 100. The instructions may include, but are not limited to, pre-fetch logic to fetch instructions, decode logic to decode the instructions, execution logic to execute instructions and the like. The processor cores 110 include a cache (not shown) to cache instructions and/or data. The cache includes, but is not limited to, a level one, level two, and a last level cache (LLC), or any other configuration of the cache memory within the processing device 100.

The processing device 100 may be used with a computing system on a single integrated circuit (IC) chip of the computing system. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

In various implementations, the processing device 100 may further host software components such as a virtual machine monitor (VMM) (also referred to as hypervisor) 130, one or more virtual machines (VMs), identified as VM 140 through VM 190 in FIG. 1. The processing device 100 may include a hardware IOMMU 150, which is also referred to as a physical or pIOMMU. The VM 140 may execute a guest OS 143 within which may be run a number of applications 142, one or more guest device drivers 145 and a guest vIOMMU driver 147. The VM 190 may execute a guest OS 193 on which may be run a number of applications 192, one or more guest device drivers 195 and a guest vIOMMU driver 197. The processing device 100 may include one or more additional virtual machines. Each guest vIOMMU driver 147 or 197 may interact with a virtual IOMMU device model (vIOMMU) 135 of the VMM 130 and the hardware IOMMU 150.

With further reference to FIG. 1, the VMM 130 may abstract a physical layer of a hardware platform of a host machine that may include the processing device 100, and present this abstraction to the guests or virtual machines (VMs) 140 or 190. The VMM 130 may provide a virtual operating platform for the VMs 140 through 190 and manages the execution of the VMs 140 through 190. In some implementations, more than one VMM may be provided to support the VMs 140 through 190 of the processing device 100. Each VM 140 or 190 may be a software implementation of a machine that executes programs as though it was an actual physical machine. The programs may include the guest OS 143 or 193, and other types of software and/or applications, e.g., applications 142 and 192, respectively running on the guest OS 143 and guest OS 193.

In some implementations, the hardware IOMMU 150 may enable the VMs 140 and 190 to use the I/O devices 160, such as network interface controllers, accelerated graphics cards, and hard-drive controllers, which may be coupled to the processing device 100, e.g., by way of a printed circuit board (PCB) or an interconnect that is placed on or located off of the PCB. The guest application 142 or guest device driver 145, in implementations, submits a workload to the I/O device 160. A workload is a request made by users or applications to the device to perform a specific function or task. The workload descriptor includes some virtual addresses of the processing device 100. The workload descriptor may be placed in memory and submitted by writing to one or more MMIO registers of device 160, or included as payload of workload submission instruction and then sent to device submission port directly. The I/O device 160 processes the workload which includes sending DMA requests to access the specified virtual addresses. For each DMA request out of the I/O device 160, the IOMMU 150 translates the virtual address specified by the request to a corresponding physical address. Then, the translated DMA request (containing the physical address) is forwarded by the IOMMU 150 to the memory controller 120.

VMM 130, in implementations, virtualizes the IOMMU to expose a "virtual IOMMU" 135 to the VM 140. Then, based on captured operations on the virtual IOMMU 135, the VMM 130 configures the physical IOMMU 150 to support the guest-initiated SVM operations on guest vIOMMU drivers 147, 197. In some implementations, the hypervisor emulates a virtual IOMMU 135, so that a guest PASID table (not shown) may be retrieved and then programmed to the physical IOMMU 150. Once guest PASID table is assigned to the IOMMU 150, guest software using the guest vIOMMU driver 147 may start workload submissions (DWQs or SWQs) that include the guest PASID and follow device specifications without VMM 130 intervention. The processing device 100 may also include a host PASID table (not shown) managed by the VMM 130. For example, the VMM allocates a host PASID and programs it in a host PASID table of the physical IOMMU's for nested translation using pointers to a first level (GVA→GPA) translation table and second level (GPA→HPA) translation table. Here the host PASID table may be indexed by using the guest PASID received from a VM, or using a distinct host PASID (i.e. different from guest PASID). The former has the same effect as directly linking guest PASID table, i.e. guest PASID from device is expected, which are both called "guest PASID table" in this writing. The later requires translation from guest PASID to host PASID, which is called "host PASID table". In this regard, the guest PASID table is used for PF/VF 163 and the host PASID table is for ADIs 165 of the I/O device 160.

The I/O devices 160 may issue memory access requests, such as memory read and write requests, to access memory locations in the memory. The memory access requests may be part of a DMA read or write operation, for example. The DMA operations may be initiated by software executed by the processing device 100 directly or indirectly to perform the DMA operations. Depending on the address space in which the software executing on the processing device 100 is running, the I/O devices 160 may be provided with addresses corresponding to that address space to access the memory. For example, a guest application (e.g., application 142) executing on processing device 100 may provide an I/O device 160 with guest virtual addresses (GVAs). When the I/O device 160 requests a memory access, the guest virtual addresses may be translated by the hardware IOMMU 150 to corresponding host physical addresses (HPA) to access the memory, and the host physical addresses may be provided to the memory controller 120 for access.

If Scalable IOV is enabled on one of the I/O devices 160, the device includes one or more assignable device interfaces (ADIs) 165 for each hosting function (not shown) supported by the device. If a different one of the devices 160 supports SR-IOV, then the device includes one or more virtual functions (VFs) 163. Each of the ADIs 165 and VFs 163 support one or more work submission interfaces. These interfaces enable a guest device driver, such as guest device drivers 145 and 195, of the VMs 140 and 190 to submit work directly to work queues 169 of the I/O devices 160 without host software intervention by the VMM 130. The type of work submission, but may include a dedicated work queue (DWQ) and/or shared work queue (SWQ) based work submissions. In some examples, the work queue 169 may be represented by a ring, a linked list, an array or any other data structure used by the I/O devices 160 to queue work from software. The work queues 169 include payload-descriptor storage (that convey the commands, operands for the work), and may be implemented with explicit or implicit doorbell registers (e.g., ring tail register) or portal registers to inform the I/O device 160 about new work submission.

The ADIs 165 are a much more light-weight version of the VFs 163 that may be directly assigned to a VM or to another container. Each ADI 165 contains one or multiple 4 KB pages of MMIO registers for fast data-path submission (e.g., frequent data path accesses that are performance critical) that may be accessed directly from VM 140, 190. Typically, slow control-path resources (e.g. PCI configuration space, VF MMIO BAR, PCI MSI-X table, etc.) are absent from ADI devices. VMM 130 composites the ADIs 165 into a virtual device (VDEV 131) which is controlled by guest driver 145 and configures the VM 140 access policy on device resources. From VM point of view, the VDEV 131 behaves like a common PCI endpoint device. In some implementations, VDEV 131 may include fast data-path accesses that are passed through to ADIs, and slow control-path accesses (e.g., infrequent accesses not performance critical) that are fully trap-and-emulated by the system software.

In some implementations, fast data-path accesses from the VM 140 are passed through to ADIs 165, while slow control-path accesses (e.g., infrequent accesses not performance critical) are fully trap-and-emulated by the system software.

As all ADIs 165 shares the same BDF of the hosting function, Scalable IOV utilizes the PASID to identify ADIs from each other, regardless of whether the ADI is doing non-SVM or SVM transaction. Thus, the PASID is now managed by VMM 130, which leads to the concept of translation between two PASID spaces, such as from a guest PASID space to a host PASID space, because guest PASID cannot be directly used by IOMMU 150 in such situation. For DWQ submissions, the interface of programming the PASID falls into the concept of slow-control path operations and thus is trap-and-emulated by VMM 130. The VMM 130 translates a captured guest PASID to a host PASID which is then programmed to the I/O device 160. For SWQ submissions, a PASID translation structure residing within a VMCS is used. The VMCS (not shown) is stored in a region of memory and contains, for example, state of the guest, state of the VMM, and control information indicating under which conditions the VMM wishes to regain control during guest execution. The PASID translation structure is used to translate the guest PASID to a host PASID before the workload submission instruction goes out to the bus. This is so the device will always receive the host PASID consistently. In such a configuration, a host PASID table in the IOMMU is managed by VMM 130 and the PASID field on the PCI wire is always the host PASID.

In some implementations, if Scalable IOV is enabled, the SVM capable I/O device includes one or more assignable interfaces (ADIs) for the hosting function supported by the device, and host PASID is always expected as aforementioned. If the device supports SR-IOV, then the device may include one or more virtual functions (VFs) for each physical function (PF). In such cases, for a DWQ path on an assigned PF/VF 163, the guest PASID is observed on the PCI bus due to the guest programming of the PASID (thru MMIO registers) is passed through to the device without VMM 130 intervention. In another instance, for a SWQ path on the same assigned PF/VF 163, host PASID is observed on the PCI bus because the VMCS PASID translation takes effects for all workload instructions, regardless of whether the instruction targets PF/VF 163 or ADI 165. Due to the mixed DWQ/SWQ usage on the PCI bus, a PASID conflict may occur on the assigned PF/VF 163 as one device may be linked to only one PASID table in the IOMMU 150. This conflict may cause a fatal system runtime error because the IOMMU is not able to differentiate whether the received PASID should be treated as a guest PASID or a host PASID for a given PF/VF.

Embodiments of the disclosure enable a PASID translation unit 180 to bypass or perform PASID translation using hardware paging hint when executing a workload submission instruction based on the type of work queue used and the type of the I/O device interface. The decision to bypass PASID translation is made based on the value of an I/O hint bit that is configured by the hypervisor in the CPU page table. The I/O hint bit may be configured when the device is assigned to the VM. The I/O hint bit may be represented by one of the unused reserved bits of a CPU page table entry. In one example, the CPU page table may be the Extended Page Table (EPT) managed by the hypervisor, and the I/O hint bit may be represented by bit 62 of an EPT entry. The memory management unit (MMU) 184 may implement the I/O hint bit in the CPU page table. The PASID translation manager 182 in the VMM may configure the CPU page table, including configuring the I/O hint bit. The PASID translation unit 180 may translate a guest PASID in the workload instruction to a host PASID that may be used by an ADI SWQ device (e.g., I/O device). Alternatively, the PASID translation unit 180 may bypass the translation of the guest PASID so that the guest PASID may be used by a PF/VF SWQ device. In accordance with embodiments of the disclosure, the hypervisor may set the value of the I/O hint bit in the CPU page table entry corresponding to the PASID when assigning an I/O device to the VM. If Scalable-IOV is enabled, the hypervisor may set the value of the I/O hint bit to a pre-defined value (e.g. 0), indicating that VMCS PASID translation should be executed. If Scalable-IOV is disabled, then the I/O device (being a PF or VF) may use the untranslated PASID on the workload instruction for all DMA transactions. In this case, the hypervisor may set the value of the I/O hint bit to a pre-defined value (e.g. 1), indicating that VMCS PASID translation should be bypassed.

To determine whether PASID translation is to be performed or bypassed, the processing device 100 implements a PASID translation unit 180, also referred to herein as a translation circuit. For example, the PASID translation unit 180 may be implemented in a separate hardware component, circuitry, dedicated logic, programmable logic, and microcode of the processing device 100 or any combination thereof. In one implementation, the PASID translation unit 180 may include a micro-architecture including processor logic and circuits similar to the processing cores 110. In some implementations, the PASID translation unit 180 may include a dedicated portion of the same processor logic and circuits used by the processing cores 110.

Figure 2:
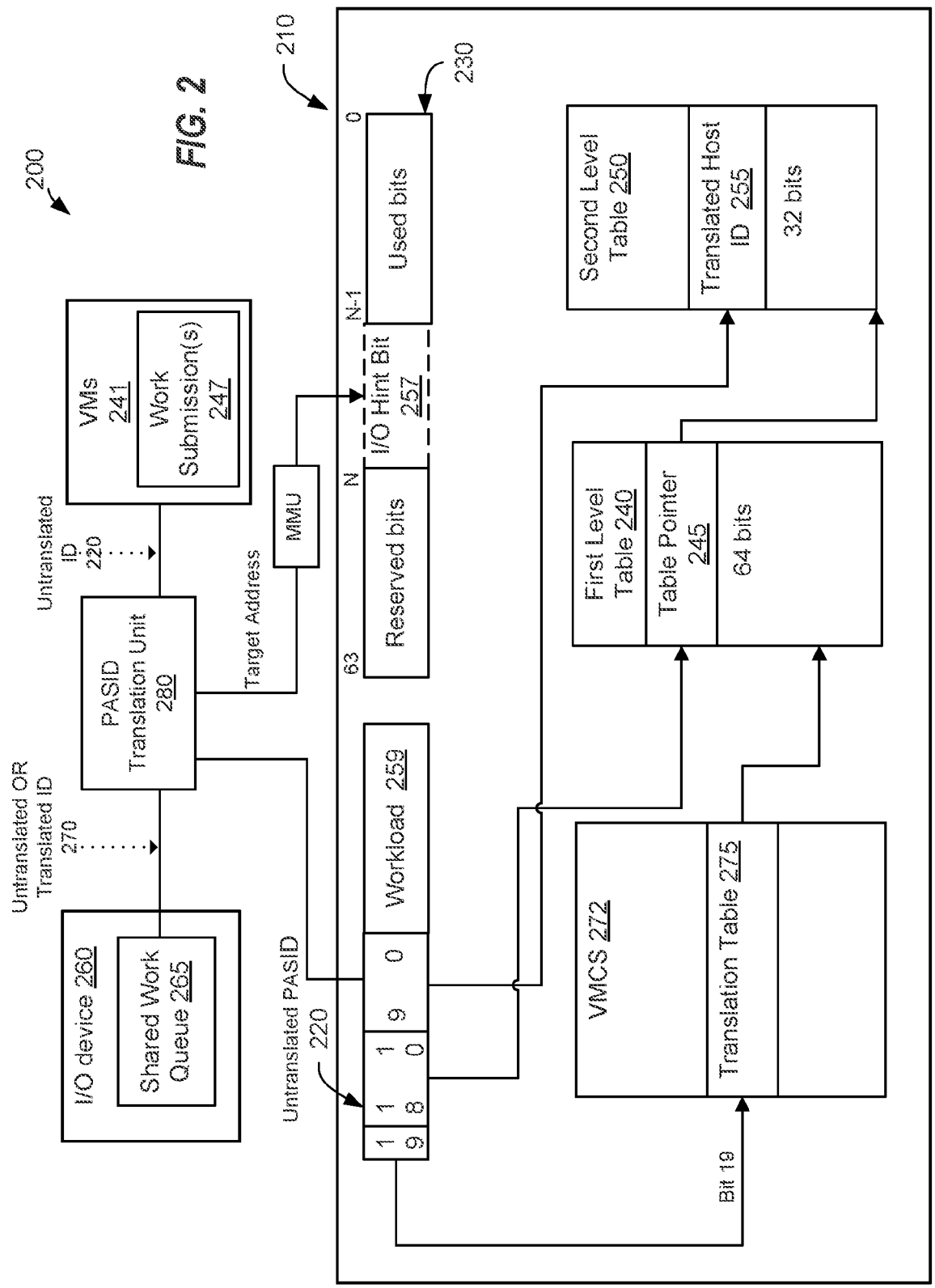
FIG. 2 illustrates a block diagram of an apparatus including a memory for process address space identifier virtualization using hardware paging hint, according to one embodiment.

FIG. 2 illustrates a block diagram of an apparatus 200 including a memory 210 for address space identifier management in complex input/output virtualization environments according to one embodiment. The apparatus 200 may be compared to the processing device 100 of FIG. 1. For example, the apparatus 200 includes the PASID translation unit 280 (which may be compared to the PASID translation unit 180 of FIG. 1), a plurality of VMs 241 (which may be compared to the VMs 140 and 190 of FIG. 1) and an I/O device 260 (which may be compared to the I/O devices 160 of FIG. 1). In this example, work submissions 247 to the I/O device 260 are implemented using a shared work queue (SWQ) 265. The SWQ 265 may be used by more than one software entity simultaneously, such as by the VMs 241. The I/O device 260 may support any number of SWQs 265. A SWQ may be shared among multiple VMs (e.g., guest drivers). The guest driver in the VMs 241 may further share the SWQ with other kernel mode and user mode clients within the VMs, which may use shared virtual memory (SVM) to submit work directly to the SWQ.

In some implementations, the VMs 241 transmits work submissions 247 to the work queue 265 using workload submission instructions. These instructions are "general purpose" in the sense that they may be used to queue work to SWQ(s) of any devices irrespective of the type of device to which the command is targeted. Such an instruction produces an atomic non-posted write transaction (a write transaction for which a completion response is returned back to the processing device). The non-posted write transaction is address routed like any normal MMIO write to the target device. The non-posted write transaction carries with it the PASID of the thread/process that is submitting this request. It also carries with it the privilege (ring-3 or ring-0) at which the instruction was executed on the host. It also carries a command payload that is specific to target device. These SWQs are typically implemented with work-queue storage on the I/O device but may also be implemented using off-device (host memory) storage.

Unlike DWQs, the SWQ 265 (due to its shared nature) does not have a pre-programmable PASID register. Instead, the PASID allocated to the software entity (e.g., VM 241) "gPASID" is included in the workload instruction as part of the work submission 247. The PASID translation unit 280 may bypass PASID translation when processing the workload based on the type of work queue used and the type of the I/O device 260 interface. The decision to bypass PASID translation is determined based on the value of an I/O hint bit 257 that was configured by the hypervisor in CPU page table entry 230 corresponding to the PASID when the device is assigned to the VM. The I/O hint bit may be one of the unused reserved bits of a CPU page table entry. In one example, the CPU page table may be the Extended Page Table (EPT) managed by the hypervisor and the I/O hint bit may be an I/O hint represented by bit 62 of an EPT entry. The I/O hint bit may determine whether PASID translation is to be performed or bypassed based on whether Scalable-IOV is enabled on the device. In one example, when the I/O hint bit 257 is set to a pre-defined value (e.g. 0), the PASID translation unit 280 may translate the gPASID 220 in the workload instruction to an hPASID 255 and replace the gPASID in the workload 259 with the translated hPASID. This may allow an ADI SWQ I/O device (Scalable-IOV is enabled) to utilize a translated hPASID as expected. In another example, when the I/O hint bit 257 is set to another pre-defined value other than 0 (e.g. 1), the PASID translation unit 280 may bypass the translation of the gPASID so that the gPASID may be kept in the workload and utilized by a PF/VF SWQ device (Scalable-IOV is disabled).

In accordance with embodiments of the disclosure, the hypervisor may set the value of the I/O hint bit in the CPU page table entry 230 corresponding to the PASID when assigning an I/O device to the VM. In one example, the CPU page table may be represented by the Extended Page Table (EPT) managed by the hypervisor and the I/O hint bit may be represented by bit 62 of an EPT entry. If Scalable-IOV is enabled, the hypervisor may set the value of the I/O hint bit to a pre-defined value (e.g. 0), indicating that VMCS PASID translation should be executed. If Scalable-IOV is disabled, then the I/O device (being a PF or VF) may use the untranslated PASID on the workload instruction for all DMA transactions. In this case, the hypervisor may set the value of the I/O hint bit to a pre-defined value (e.g. 1), indicating that VMCS PASID translation should be bypassed. In one example, the I/O hint bit may also be included in related entries in a translation lookaside buffer (TLB) and/or other page table caches. TLB is a cache used to improve virtual address translation speed by caching virtual to physical address translations. In another example, the CPU page table may be a sub-page protection (SPP) table that may provide less than 4 Kilobyte granular paging control. Because each device has its own MMIO address range with no overlap among devices, a PF/VF or an ADI device may get its own unique page table entry (thus its own I/O hint bit) for its workload submission.

To translate an untranslated PASID 220 to translated PASID 255, the apparatus 200 implements a PASID translation table 275 in the hardware-managed per-VM state structure also referred to as the VMCS 272. The VMCS 272 may be stored in a region of memory 210 and contains, for example, the state of the guest, the state of the VMM, and the control information indicating under which conditions the VMM regains control during the guest execution. The VMM may set up the PASID translation table 275 in the VMCS 272 to translate an untranslated PASID 202 to translated PASID 255 as part of the SWQ execution. The PASID translation table 275 may be implemented as a single level or multi-level table that is indexed by untranslated PASID 220 that is contained in the work instruction submitted to the work queue 265. The untranslated PASID 220, in implementations, comprises a plurality of bits that are used for the translation of the untranslated PASID. The bits may include, for example, bits that are used to identify an entry in the first level PASID translation table 240, and bits that are used to identify an entry in the second level PASID translation table 250.

When the I/O hint bit 257 is set to a value other than 0, the PASID translation unit 280 attempts to translate the gPASID 220 to an hPASID 255 using the PASID translation table 275 and add it to a workload instruction 259, replacing the gPASID 220. In some implementations, the PASID translation unit 280 may use the bit 19 in the untranslated (Guest) PASID as an index into the VMCS 272 to identify the (two entry) PASID translation table 275. In one implementation, the PASID translation table 275 may include a pointer to base address of the first level PASID table 240. The first level PASID table 240 may be indexed by the untranslated PASID (bits 18:10) to identify a PASID table pointer 245 to a base address of the second level PASID table 250, which is indexed by the untranslated PASID (bits 9:0) to find the translated (host) PASID 255.

If the PASID translation is completed successfully by the PASID translation unit 280, the translated PASID 255 is inserted into the payload 270 associated with the workload instruction 247, replacing the untranslated ID 220. The I/O device 260 may then use the hPASID when executing the workload instruction. If the PASID translation unit 280 determines that the translation was unsuccessful, an alert is generated that causes a VMExit at VM 241. In some embodiments, the VMM creates a translation from the untranslated PASID to a translated PASID in the PASID translation table as part of VMExit handling. In alternative embodiments, the translation may also be created when emulating vIOMMU operations, which happens before issuance of the workload instruction.

After VMM handles the VMExit, the VM 241 is resumed and the instruction is retried. On subsequent executions of workload instructions by the SVM client, the PASID translation unit 280 may successfully find the host PASID 255 in the PASID translation table 275. The SWQ receives the work instruction 270 and uses either the guest PASID 220 or the host PASID 255 to send address translation requests to the IOMMU (such as hardware IOMMU 150 of FIG. 1) to identify a physical page in the memory 210. When the VMExit occurs, the VMM checks the guest PASID in the virtual IOMMU's PASID table. If the guest PASID is configured in the virtual IOMMU, the VMM allocates a new host PASID and sets up the PASID translation table 275 in the VMCS 272 to map the guest PASID 220 to the host PASID 255. The VMM also sets up the host PASID 220 in the physical IOMMU for nested translation using the first level (GVA→GPA) and second level (GPA→HPA) translation (shown in FIG. 2 within the memory 210). If the guest PASID 220 is not configured in the virtual IOMMU, the VMM may treat it as an error and either injects a fault into the VM 241 or suspends the VM 241.

Figure 3:
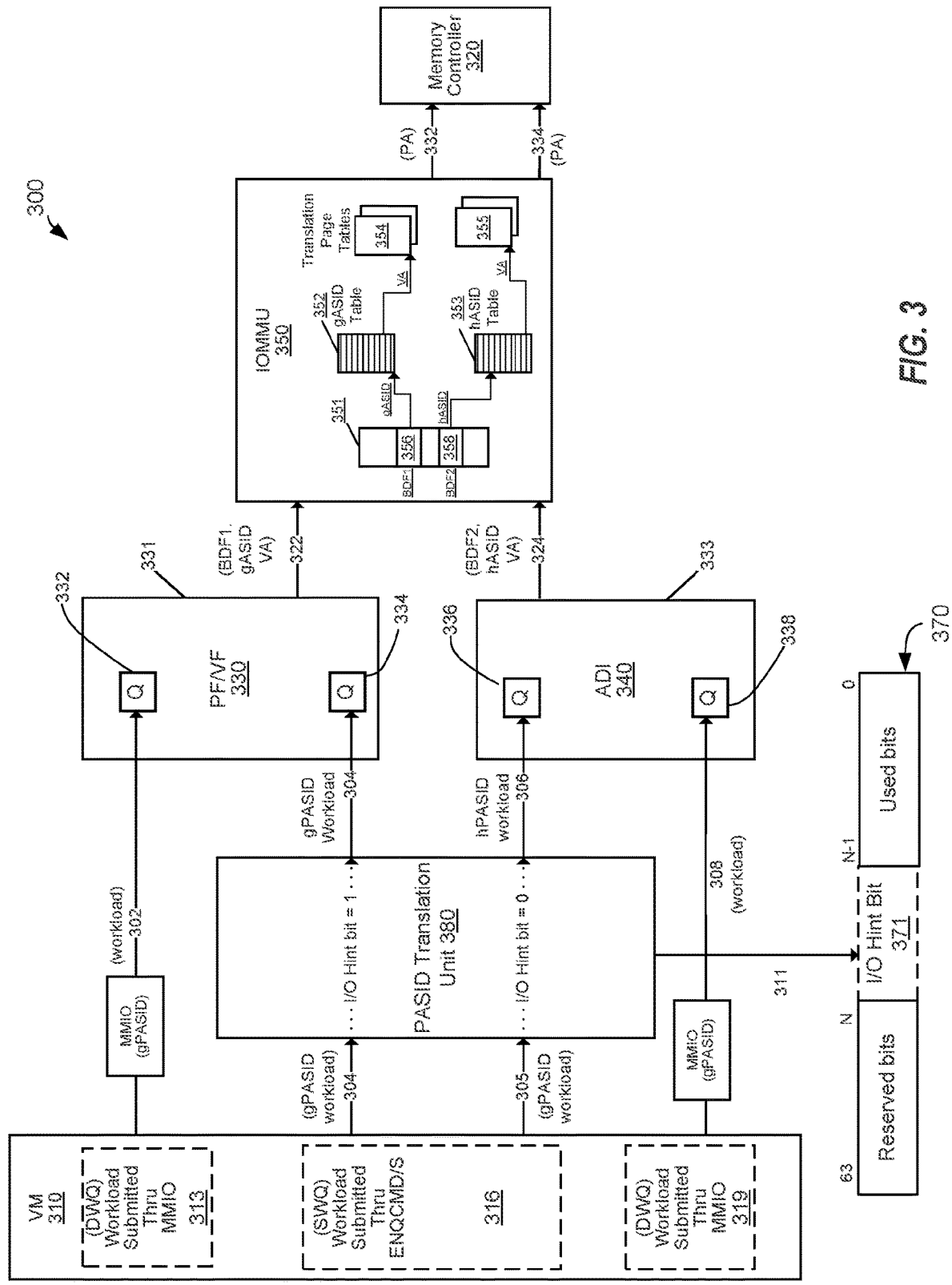
FIG. 3 illustrates a block diagram of a system to support process address space identifier virtualization using hardware paging hint, according to one embodiment.

FIG. 3 illustrates a block diagram of a system 300 to support address space identifier translation in complex input/output virtualization environments according to one embodiment. The system 300 may be represented by the processing device 100 of FIG. 1 and the apparatus of FIG.

2. For example, the system 300 includes a PASID translation unit 380 (which may be compared to the PASID translation unit 180 of FIG. 1 and the PASID translation unit 280 of FIG. 2), a VM 310 (which may be compared to the VMs 140 and 190 of FIG. 1 and the plurality of VMs 241 of FIG. 2), and IOMMU 350 (which may be compared to the IOMMU 150 of FIG. 1) and a memory controller 320 (which may be compared to the memory controller 120 of FIG. 1). In this example, a VMM (not shown) may assign a hosting function (SR-IOV VF or PF) 330 of SVM capable I/O devices 331, 333 to the VM 310. Some SVM capable I/O devices, such as device 331, implement SR-IOV VF/PF 330, while other SVM capable I/O devices, such as device 333, implement an assignable device interface (ADI) 340 for the hosting function supported by the device. The VM 310 may submit work directly to work queues (e.g., Q 332, 334, 336, 338) associated with the PF/VFs 330 and ADIs 340. The "work queue" may be, for example, a ring, a linked list, an array or any other data structure used by the I/O devices to queue work from software. The exact method for work submission is device-specific, but the work queues (e.g., Q 332, 334, 336, 338) may be broadly classified into a dedicated work queue (DWQ) and shared work queue (SWQ) based work submissions.

Work submissions from the VM 310, in embodiments, may be submitted to one or more dedicated work queues, such as DWQ 313, 319 or a shared work queue (SWQ) 316. For example, software logic 313, 319 utilizing a DWQ interface to submit work submissions (e.g., to Q 332, 338) may be associated with an MMIO register. The MMIO register may be programmed by the VM 310 with a guest PASID that is used to process work from the DWQ. The software logic 316 for SWQ work submissions may be used by more than one software entity simultaneously, such as by the VMs 310. The I/O device may support any number of SWQs. A SWQ (such as Q 334 and Q336) may be shared among multiple VMs (e.g., guest drivers). The guest driver in the VMs 310 may further share the SWQ 316 with other kernel mode and user mode clients within the VMs, which may use shared virtual memory (SVM) to submit work directly to the SWQ 316.

VM 310 performs SWQ work submissions using certain workload instructions. These instructions are "general purpose" in the sense that they may be used to queue work to SWQ(s) of any devices irrespective of the type of device to which the command is targeted. These instructions produce an atomic non-posted write transaction (a write transaction for which a completion response is returned back to the processing device). The non-posted write transaction is address routed like any normal MMIO write to the target device. The non-posted write transaction carries with it the PASID of the thread/process that is submitting this request (gPASID). It also carries with it the privilege (ring-3 or ring-0) at which the instruction was executed on the host. It also carries a command workload that is specific to target device. The PASID translation unit 380 may bypass the gPASID translation based on the type of the target device.

In accordance with embodiments of the disclosure, the hypervisor may set the value of the I/O hint bit in the CPU page table entry 370 corresponding to the PASID when assigning an I/O device to the VM. In one example, the CPU page table may be the Extended Page Table (EPT) managed by the hypervisor and the I/O hint bit may be bit 62 of an EPT entry. If Scalable-IOV is enabled, the hypervisor may set the value of the I/O hint bit to a pre-defined value (e.g. 0), indicating that VMCS PASID translation should be executed. If Scalable-IOV is disabled, then the I/O device (PF/VF) may use the untranslated PASID on the workload instruction for all DMA transactions. In this case, the hypervisor may set the value of the I/O hint bit to a pre-defined value (e.g. 1), indicating that VMCS PASID translation should be bypassed. In one example, the I/O hint bit may also be included in related entries in a translation lookaside buffer (TLB) and/or other page table caches. TLB is a cache used to improve virtual address translation speed by mapping virtual and physical address spaces.

To enable the (SWQ) work queues Q 334, Q 336 to use either the gPASID 304 or the hPASID 306 to send DMA requests to the IOMMU for translation, the PASID translation unit 380 may bypass the gPASID 304 translation. The decision to bypass PASID translation when processing the workload submitted by the VM 310 is based on the value of an I/O hint bit 371 of the CPU page table entry 370 that corresponds to the PASID. The I/O hint bit may be one of the unused reserved bits of a CPU page table entry. In one example, the CPU page table may be the Extended Page Table (EPT) managed by the hypervisor and the I/O hint bit may be bit 62 of an EPT entry. The I/O hint bit is a hardware hint that determines whether PASID translation may be bypassed based on whether Scalable-IOV is enabled on the device. In one example, when the I/O hint bit 371 is set to a value of 0, the PASID translation unit 380 may translate the gPASID 304 in the workload submission instruction to an hPASID 306 and replace the gPASID 304 in the workload with the translated hPASID 306. This may allow ADI SWQ I/O device 340 (Scalable-IOV is enabled) to utilize translated hPASID 306, which corresponds to a physical page in the memory. In another example, when the I/O hint bit 371 is set to a value other than 0, the PASID translation unit 380 may bypass the translation of gPASID 304 so that gPASID 304 may be kept in the workload and utilized by PF/VF SWQ device 330 (Scalable-IOV is disabled) for a DMA request 222 to the IOMMU 350. This technique results in consistent PASID usage on each type of device interface.

If the PASID translation unit 380 is to translate the gPASID 304 to an hPASID 306, the PASID translation unit 380 may use several data structures as referenced in FIG. 2. If translation is successful, the host hPASID 306 is inserted into the payload of the workload instruction, replacing the gPASID 304. If the translation is not successful, it causes a VMExit at the VM 310. In one example, system 300 may store a number of data structures that are accessible by the IOMMU 350 for translation. The data structures may include, for example, a context table 351, a guest PASID table 352, a host PASID table 353 and several nested translation tables 354, 355. The data structures are used to translate virtual addresses (VA) of VM 310 associated with the DMA request 302,304 to host physical addresses (PA) 332, 334 in memory (not shown). This memory may be assessable via memory controller 320. The IOMMU may index the context table 351 by using a BDF (bus number, device number and function number) of the PF/VF 330 and ADI 340 associated with the DMA request 302,304. The IOMMU may index the context table 351 to identify a context entry pointing to either a guest PASID table 352 or a host PASID table 353. In this regard, the guest PASID table 352 does not mean the table structure is managed by the guest. Rather, it means a configuration which allows device to use the gPASID 304. The guest PASID table 352 or a host PASID table 353 is then used by the IOMMU to perform a nested 2-level translation (using translation page tables 354, 355) of the guest VA to the host PA.

Figure 4:
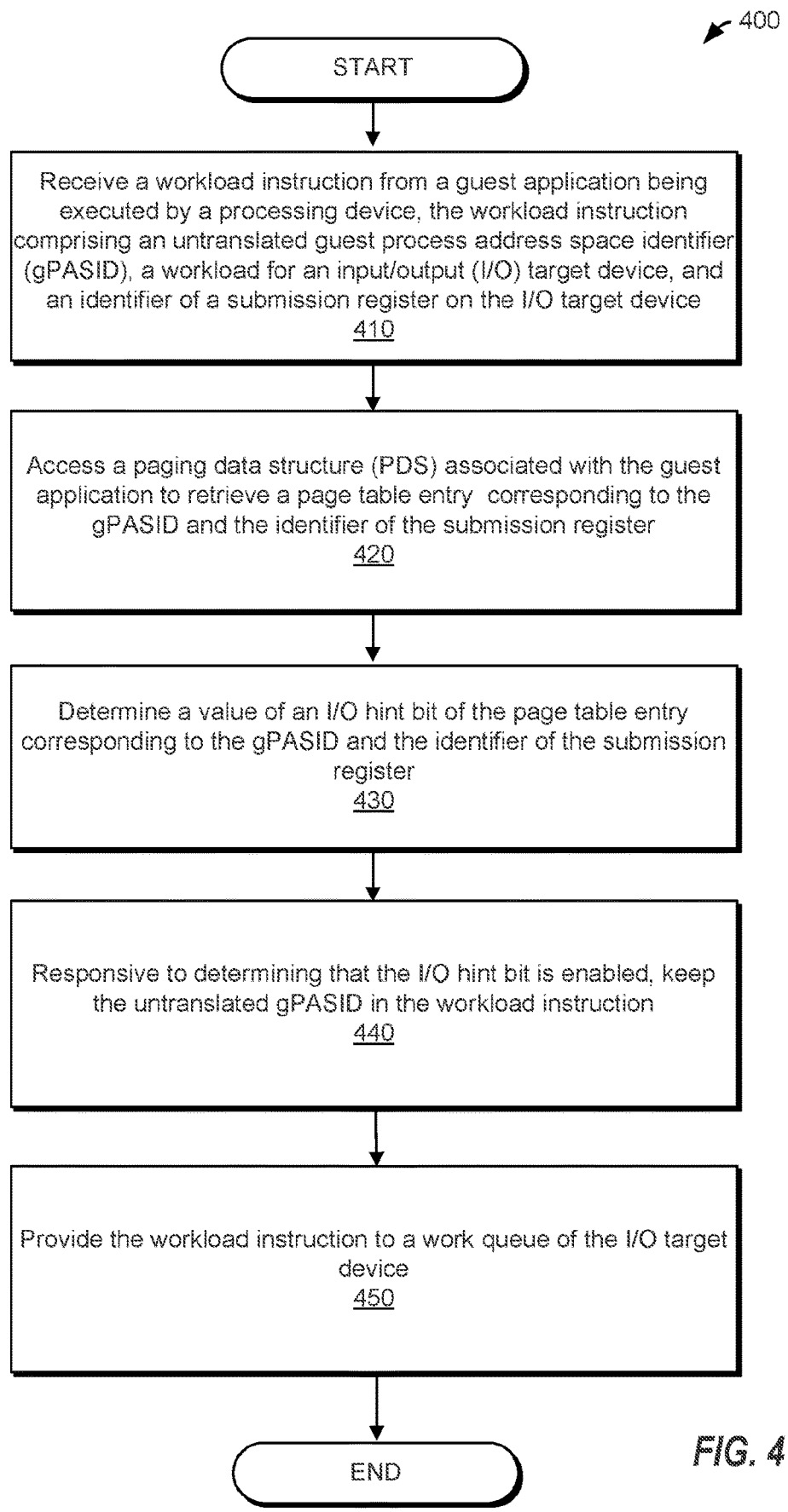
FIG. 4 illustrates a flow diagram of a processing device to support process address space identifier virtualization using hardware paging hint, according to one embodiment.

FIG. 4 illustrates a flow diagram of an example method 400 for performing process address space identifier virtualization using hardware paging hint, according to one embodiment. Method 400 may be performed by a processing device comprising hardware (e.g., circuitry, dedicated logic, programmable logic, microcode, etc.), software (such as instructions run on a processing device), firmware, or a combination thereof. In one embodiment, the PASID translation unit 180 of processing device 100 in FIG. 1 may perform method 400. Although shown in a particular sequence or order, unless otherwise specified, the order of the processes may be modified. Thus, the illustrated implementations should be understood only as examples, and the illustrated processes may be performed in a different order, and some processes may be performed in parallel. Additionally, one or more processes may be omitted in various embodiments. Thus, not all processes are required in every implementation. Other process flows are possible.

At block 410, a processing device receives a workload submission instruction from a guest application being executed by the processing device. The workload instruction may include an untranslated guest process address space identifier (gPASID), a workload for an input/output (I/O) target device, and an identifier of a submission register on the target I/O device. A workload is a request made by users or applications to the device to perform a specific function or task. The identifier of the submission register may be a virtual address of the submission port on the I/O device. The workload instruction is submitted to the I/O device on a shared workload queue (SWQ) of an assignable interface of the I/O device. Then, at block 420, the processing device accesses a paging data structure (PDS) associated with the guest application to retrieve a page table entry corresponding to the gPASID and according to the virtual address of the submission register. The paging data structure may be represented by the Extended Page Table (EPT) associated with the guest application and managed by the hypervisor.

At block 430, the processing device determines a value of an I/O hint bit of the page table entry corresponding to the gPASID and the identifier of the submission register. The I/O hint bit may be an I/O hint represented by bit 62 of an EPT entry and may represent a hardware paging hint of the EPT entry. The I/O hint bit of the page table entry corresponding to the gPASID is associated with a register of a peripheral component interconnect (PCI) endpoint device interface of the I/O device. For a PCI device, Scalable-IOV is disabled and the I/O device (being a PF or VF) may use the untranslated PASID on the workload instruction for all DMA transactions. In this case, the hypervisor may set the I/O hint bit to a pre-defined value (e.g. 1), indicating that PASID translation should be bypassed. Bypassing the gPASID translation enables the gPASID to remain in the workload as expected by a PCI I/O device.

At block 440, responsive to determining that the I/O hint bit is set to a pre-defined value (e.g. 1), the processing device bypasses the gPASID translation and keeps the untranslated gPASID in the workload instruction. In one example, the I/O hint bit may also be included in related entries in a translation lookaside buffer (TLB) and/or other page table caches. Finally, at block 450, the processing device provides the workload instruction to a shared work queue (SWQ) of the I/O device for processing using at the least the untranslated gPASID.

Figure 5:
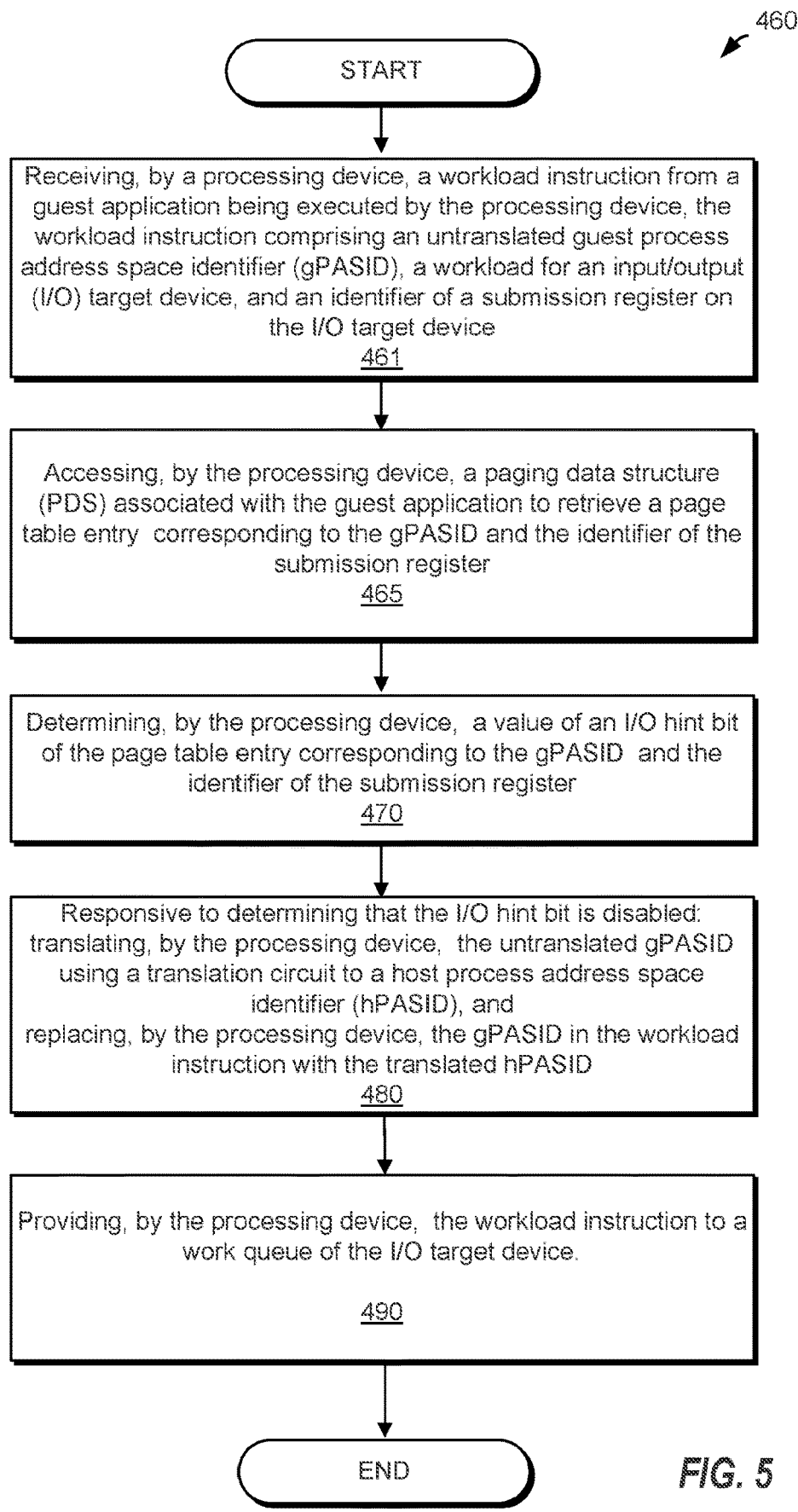
FIG. 5 illustrates a flow diagram of a method for performing process address space identifier virtualization using hardware paging hint, according to one embodiment.

FIG. 5 illustrates a flow diagram of an example method 460 for performing process address space identifier virtualization using hardware paging hint, according to one embodiment. Method 460 may be performed by a processing device comprising hardware (e.g., circuitry, dedicated logic, programmable logic, microcode, etc.), software (such as instructions run on a processing device), firmware, or a combination thereof. In one embodiment, the PASID translation unit 180 of processing device 100 in FIG. 1 may perform method 460. Although shown in a particular sequence or order, unless otherwise specified, the order of the processes may be modified. Thus, the illustrated implementations should be understood only as examples, and the illustrated processes may be performed in a different order, and some processes may be performed in parallel. Additionally, one or more processes may be omitted in various embodiments. Thus, not all processes are required in every implementation. Other process flows are possible.

Method 460 starts at block 461 by receiving, by a processing device, a workload instruction from a guest application being executed by the processing device. The workload instruction may include an untranslated guest process address space identifier (gPASID), a workload for an input/output (I/O) device, and an identifier of a submission register on the target I/O device. A workload is a request made by users or applications to the device to perform a specific function or task. The identifier of the submission register may be a virtual address of the submission port on the I/O device. The workload instruction is submitted to the I/O device on a shared workload queue (SWQ) of an assignable interface of the I/O device. Then, at block 465, the processing device accesses a paging data structure (PDS) associated with the guest application to retrieve a page table entry corresponding to the gPASID and the identifier of the submission register. The paging data structure may be represented by the Extended Page Table (EPT) associated with the guest application and managed by the hypervisor.

At block 470, the processing device determines a value of an I/O hint bit of the page table entry corresponding to the gPASID. The I/O hint bit may be represented by bit 62 of an EPT entry and may represent a hardware paging hint of the EPT entry. The I/O hint bit of the page table entry corresponding to the gPASID is associated with a register of an assignable device interface (ADI) I/O device. For an ADI device interface, Scalable-IOV is enabled and the I/O device may use the translated PASID on the workload instruction for all DMA transactions. In this case, the hypervisor may set the I/O hint bit to a pre-defined value (e.g. 0), indicating that PASID translation should be performed. At block 480, and responsive to determining that the I/O hint bit is set to a pre-defined value (e.g. 0), the processing device translates the untranslated gPASID using a translation circuit to a host process address space identifier (hPASID). The processing device then replaces the gPASID in the workload instruction with the translated hPASID. Lastly, at block 490, the processing device provides the workload instruction to a shared work queue (SWQ) of the I/O device for processing using at the least the untranslated hPASID.

Figure 6:
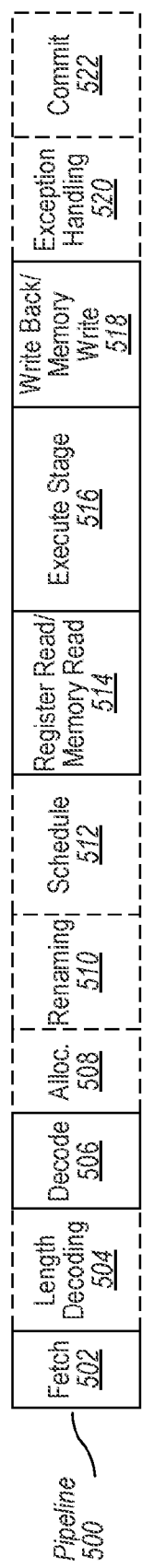
FIG. 6 is a block diagram illustrating a micro-architecture for a processor according to one embodiment.

FIG. 6 is a block diagram illustrating a micro-architecture for a processor 500 that implements techniques for performing process address space identifier virtualization using hardware paging hint functionality in accordance with one embodiment of the disclosure. Specifically, processor 500 depicts an in-order architecture core and a register renaming logic, out-of-order issue/execution logic to be included in a processor according to at least one embodiment of the disclosure. In one implementation, processor 500 may be the same as processing device 100 described with respect to FIG. 1.

Processor 500 includes a front-end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 550 may include for example a power management unit (PMU) 590 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in the in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
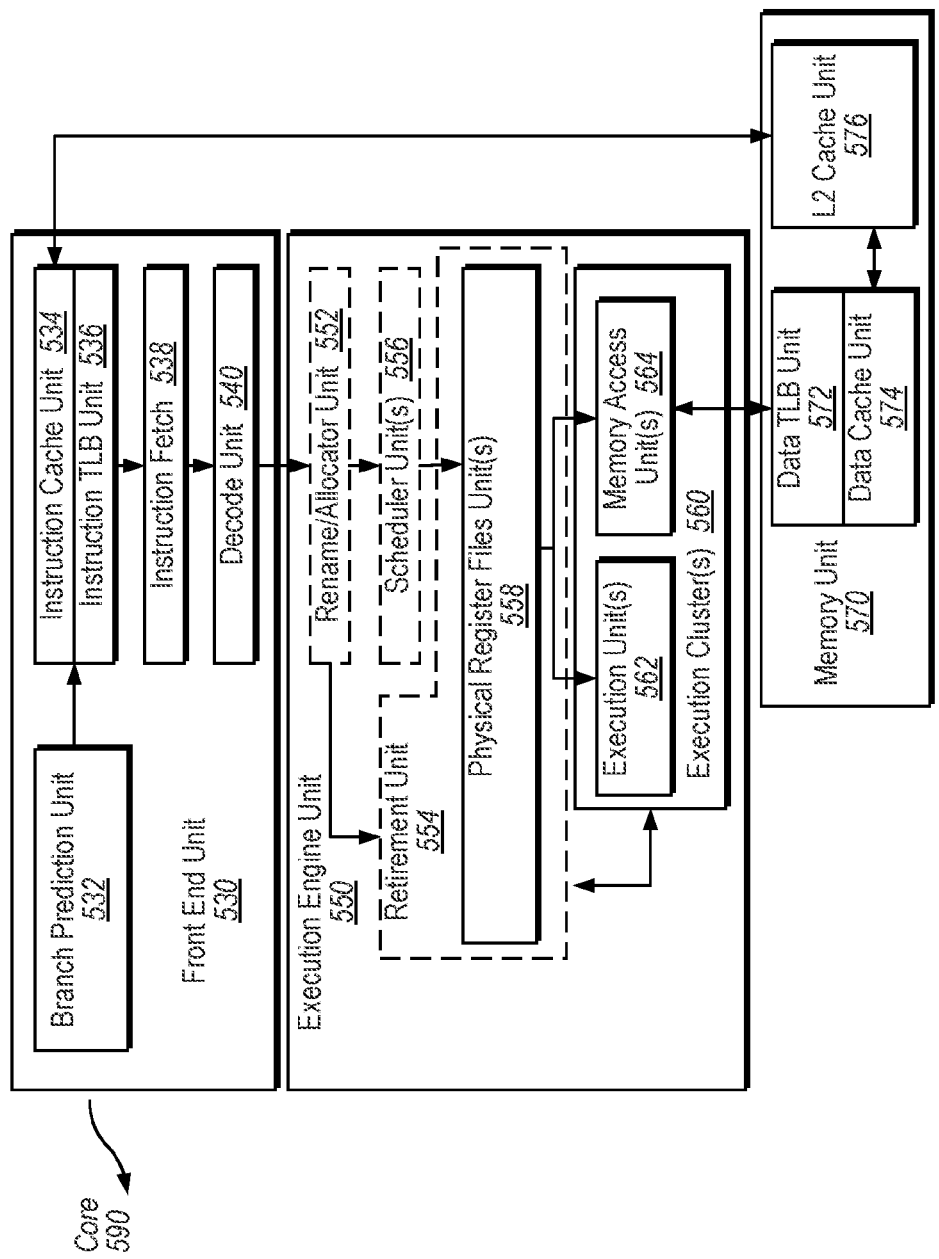
FIG. 7 is a block diagram illustrating an in-order pipeline and a register renaming stage, out-of-order issue/execution pipeline according to one embodiment.

FIG. 7 is a block diagram illustrating an in-order pipeline and a register renaming stage, out-of-order issue/execution pipeline implemented by processor 500 of FIG. 6 according to some embodiments of the disclosure. The solid lined boxes in FIG. 7 illustrate an in-order pipeline, while the dashed lined boxes illustrate a register renaming, out-of-order issue/execution pipeline. In FIG. 7, a processor pipeline 501 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 7.

Figure 8:
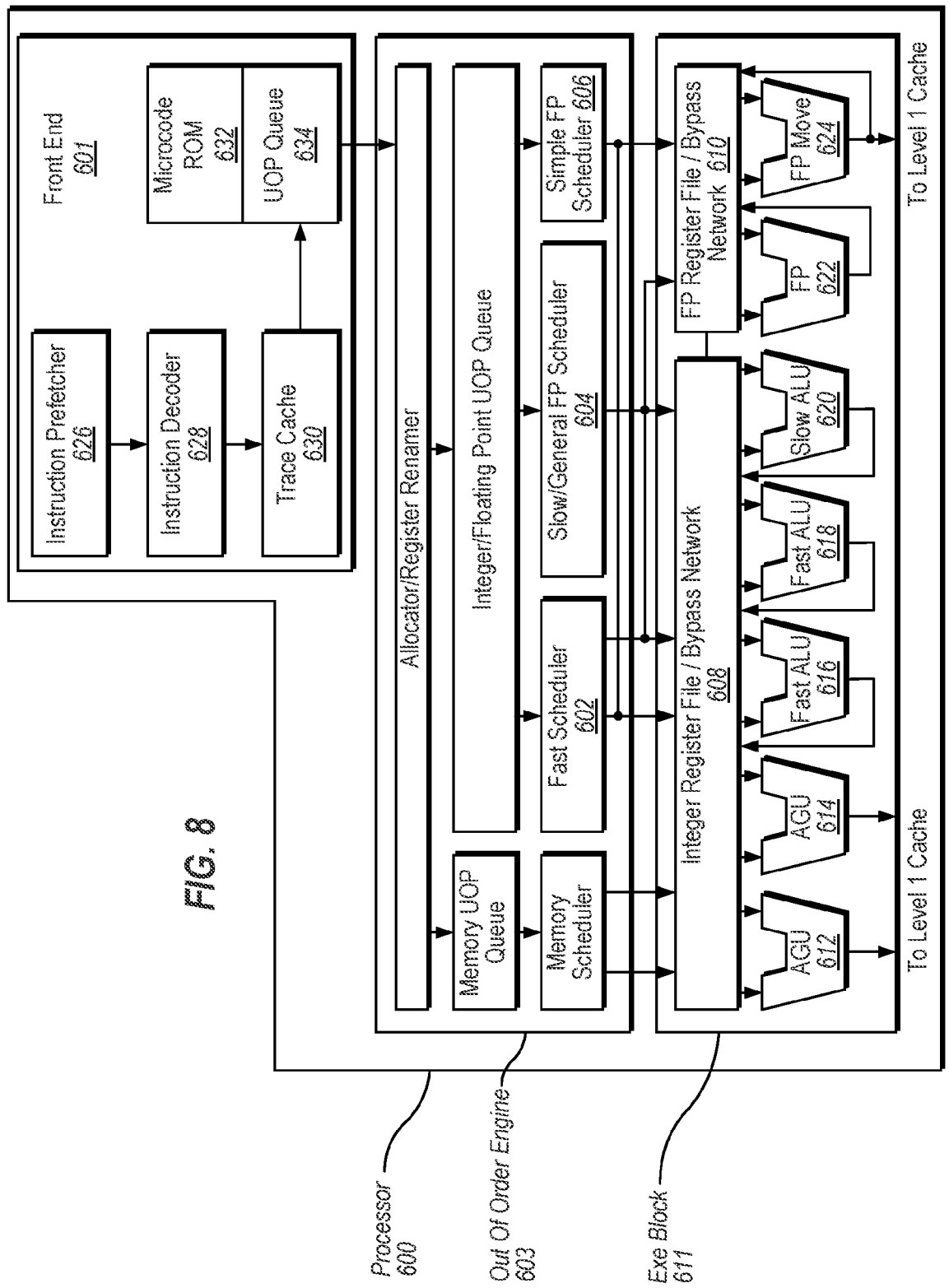
FIG. 8 is a block diagram illustrating a computer system according to one implementation.

FIG. 8 illustrates a block diagram of the micro-architecture for a processor 600 that includes logic circuits to implement techniques for process address space identifier virtualization using hardware paging hint functionality in accordance with one embodiment of the disclosure. In some embodiments, an instruction in accordance with one embodiment may be implemented to operate on data elements having sizes of byte, word, double word, quad word, etc., as well as data types, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628, which in turn decodes or interprets them. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction may be decoded into a small number of micro ops for processing at the instruction decoder 628. In another embodiment, an instruction may be stored within the microcode ROM 632 should a number of micro-ops be needed to accomplish the operation. The trace cache 630 refers to an entry point programmable logic array (PLA) to determine a correct microinstruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment may schedule on each half of the main clock cycle while the other schedulers may only schedule once per main processor clock cycle. The schedulers arbitrate for the dispatch ports to schedule uops for execution.

Register files 608, 610 sit between the schedulers 602, 604, 606, and the execution units 612, 614, 616, 618, 620, 622, 624 in the execution block 611. There is a separate register file 608, 610, for integer and floating-point operations, respectively. Each register file 608, 610, of one embodiment also includes a bypass network that may bypass or forward just completed results that have not yet been written into the register file to new dependent uops. The integer register file 608 and the floating-point register file 610 are also capable of communicating data with the other. For one embodiment, the integer register file 608 is split into two separate register files, one register file for the low order 32 bits of data and a second register file for the high order 32 bits of data. The floating-point register file 610 of one embodiment has 128 bit wide entries because floating-point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the microinstructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating-point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the disclosure, instructions involving a floating-point value may be handled with the floating-point hardware.

In one embodiment, the ALU operations go to the high-speed ALU execution units 616, 618. The fast ALUs 616, 618, of one embodiment may execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. The AGUs 612, 614, executes memory load/store operations. For one embodiment, the integer ALUs 616, 618, 620, are described in the context of performing integer operations on 64 bit data operands. In alternative embodiments, the ALUs 616, 618, 620, may be implemented to support a variety of data bits including 16, 32, 128, 256, etc. Similarly, the floating-point units 622, 624, may be implemented to support a range of operands having bits of various widths. For one embodiment, the floating-point units 622, 624, may operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement address space identifier management in complex input/output virtualization environments according to embodiments of the disclosure. In one embodiment, the execution block 611 of processor 600 may include cache controller 140 for FIG. 1, for implementing techniques for supporting address space identifier management in complex input/output virtualization environments functionality. In some embodiments, processor 700 may be the processing device 100 of FIG. 1.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32 bit integer data. A register file of one embodiment also may contain an eight multimedia SIMD register for packed data.

For the discussions below, the registers are understood to be data registers designed to hold packed data, such as 64 bits wide MMXTM registers (also referred to as 'mm' registers in some instances) in microprocessors enabled with MMXTM technology from Intel Corporation of Santa Clara, Calif. These MMXTM registers, available in both integer and floating point forms, may operate with packed data elements that accompany SIMD and SSE instructions. Similarly, 128 bits wide XMMTM registers relating to SSE2, SSE3, SSE4, or beyond (referred to generically as "SSEx") technology may also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 9:
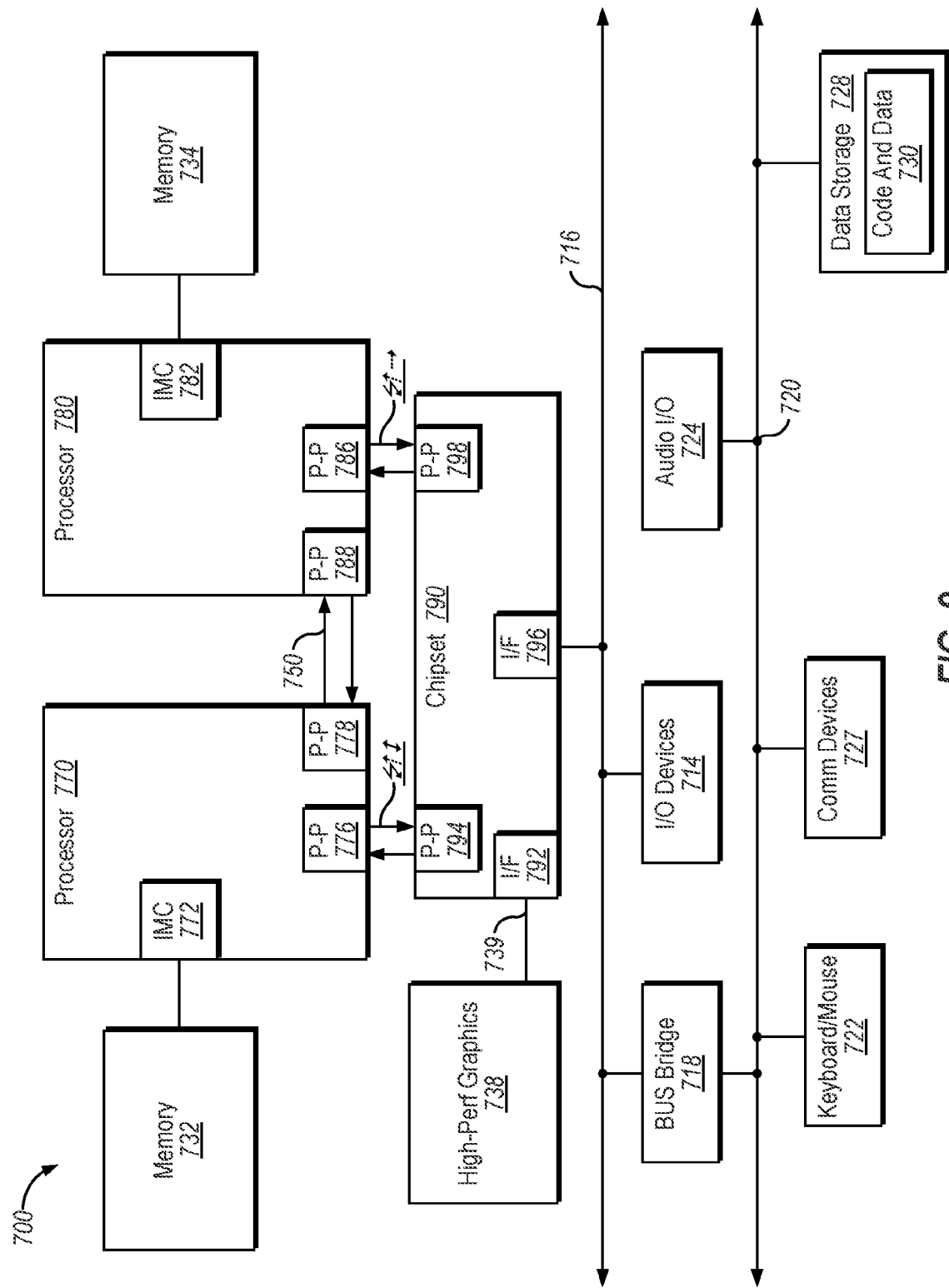
FIG. 9 is a block diagram illustrating a system in which an embodiment of the disclosure may be used.

Embodiments may be implemented in many different system types. Referring now to FIG. 9, shown is a block diagram illustrating a system 700 in which an embodiment of the disclosure may be used. As shown in FIG. 9, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement techniques for supporting process address space identifier virtualization using hardware paging hint functionality as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 9, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the disclosure is not so limited.

As shown in FIG. 9, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 9, a system may implement a multi-drop bus or other such architecture.

Figure 10:
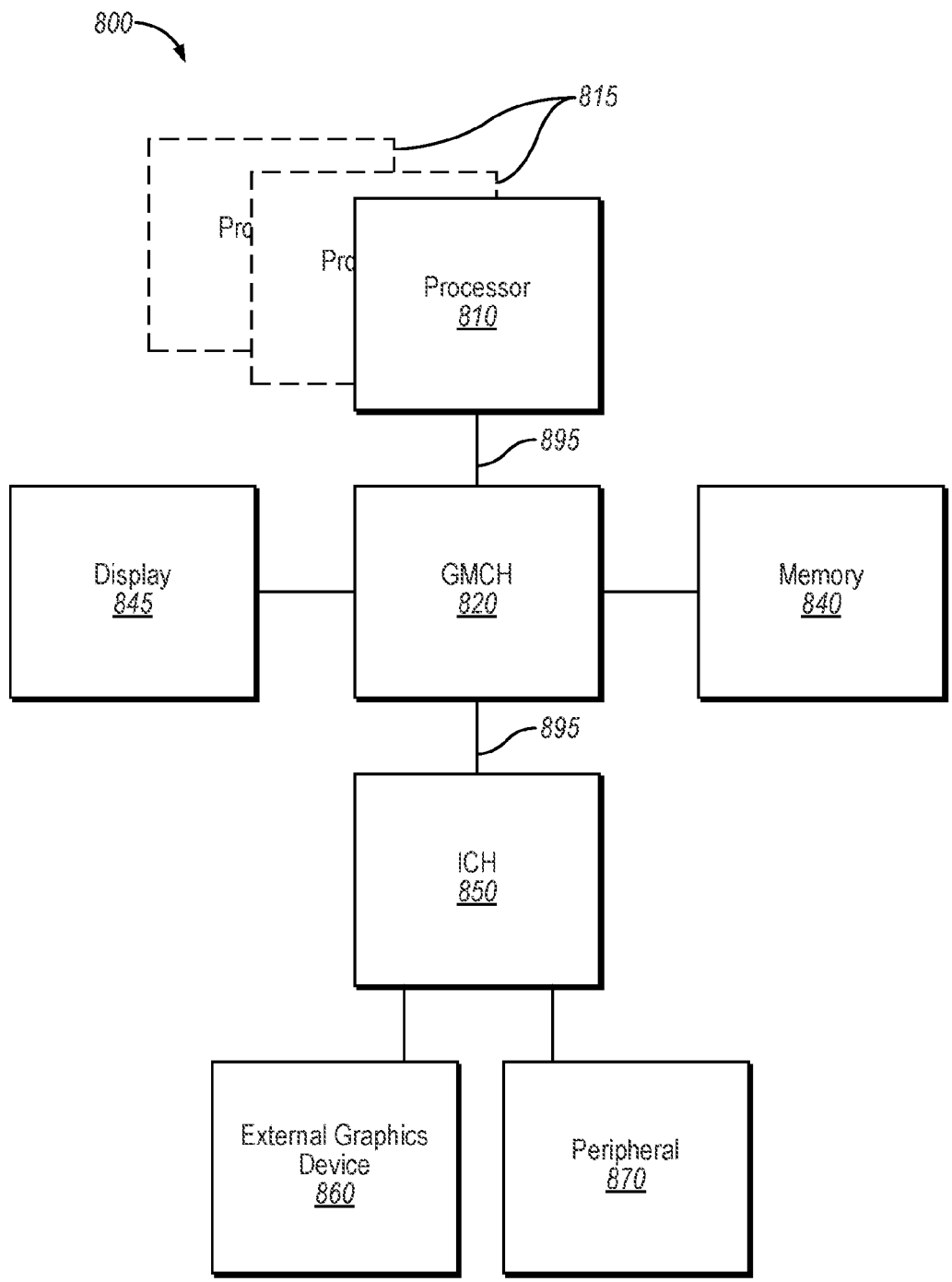
FIG. 10 is a block diagram illustrating a system in which an embodiment of the disclosure may be used.

Referring now to FIG. 10, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 10 with broken lines. In one embodiment, processors 810, 815 implement techniques for supporting process address space identifier virtualization using hardware paging hint functionality according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 10 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 10 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There may be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 11:
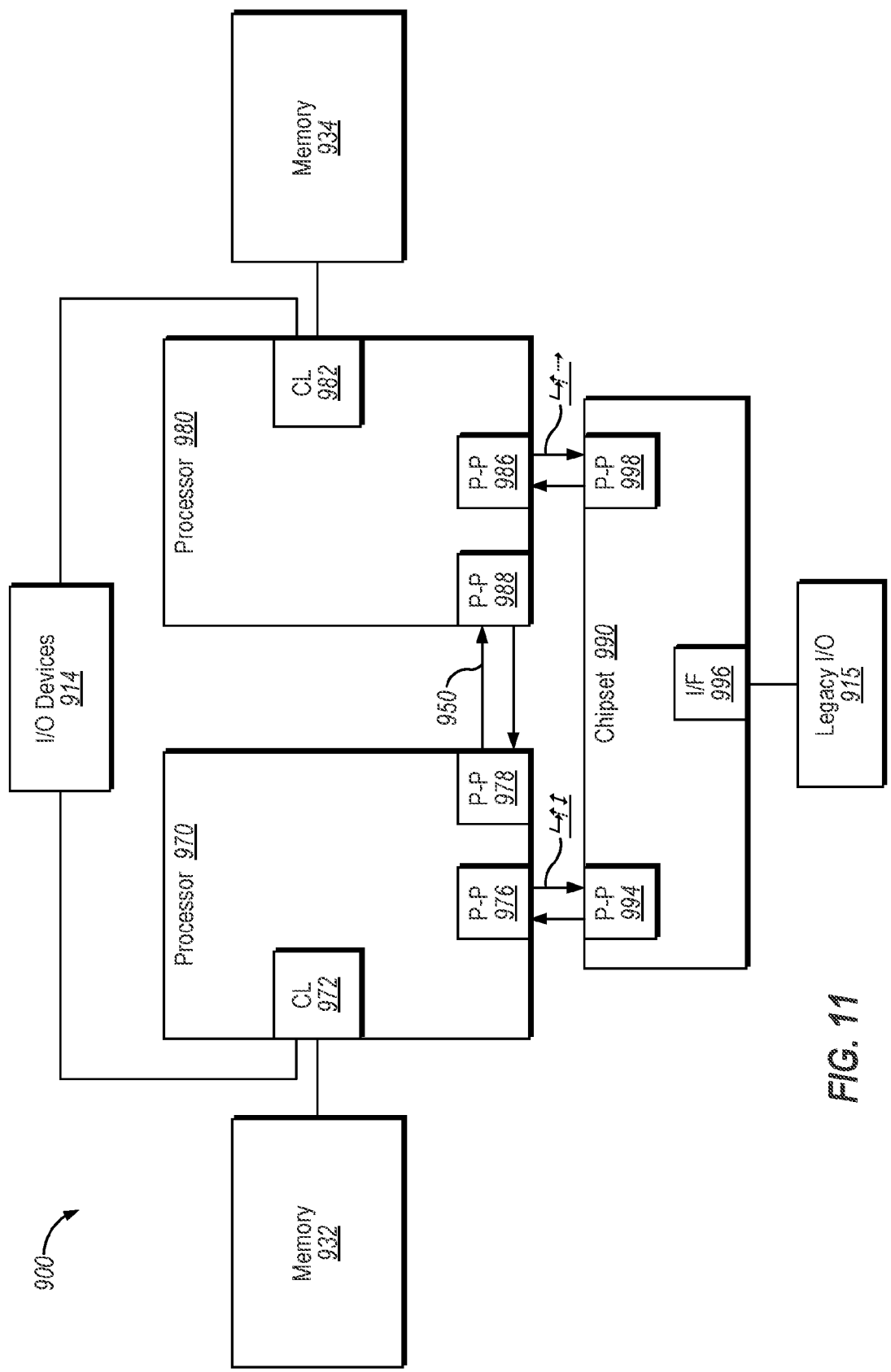
FIG. 11 is a block diagram illustrating a system in which an embodiment of the disclosure may be used.

Referring now to FIG. 11, shown is a block diagram of a system 900 in which an embodiment of the disclosure may operate. FIG. 11 illustrates processors 970, 980. In one embodiment, processors 970, 980 may implement techniques for supporting process address space identifier virtualization using hardware paging hint functionality as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 12:
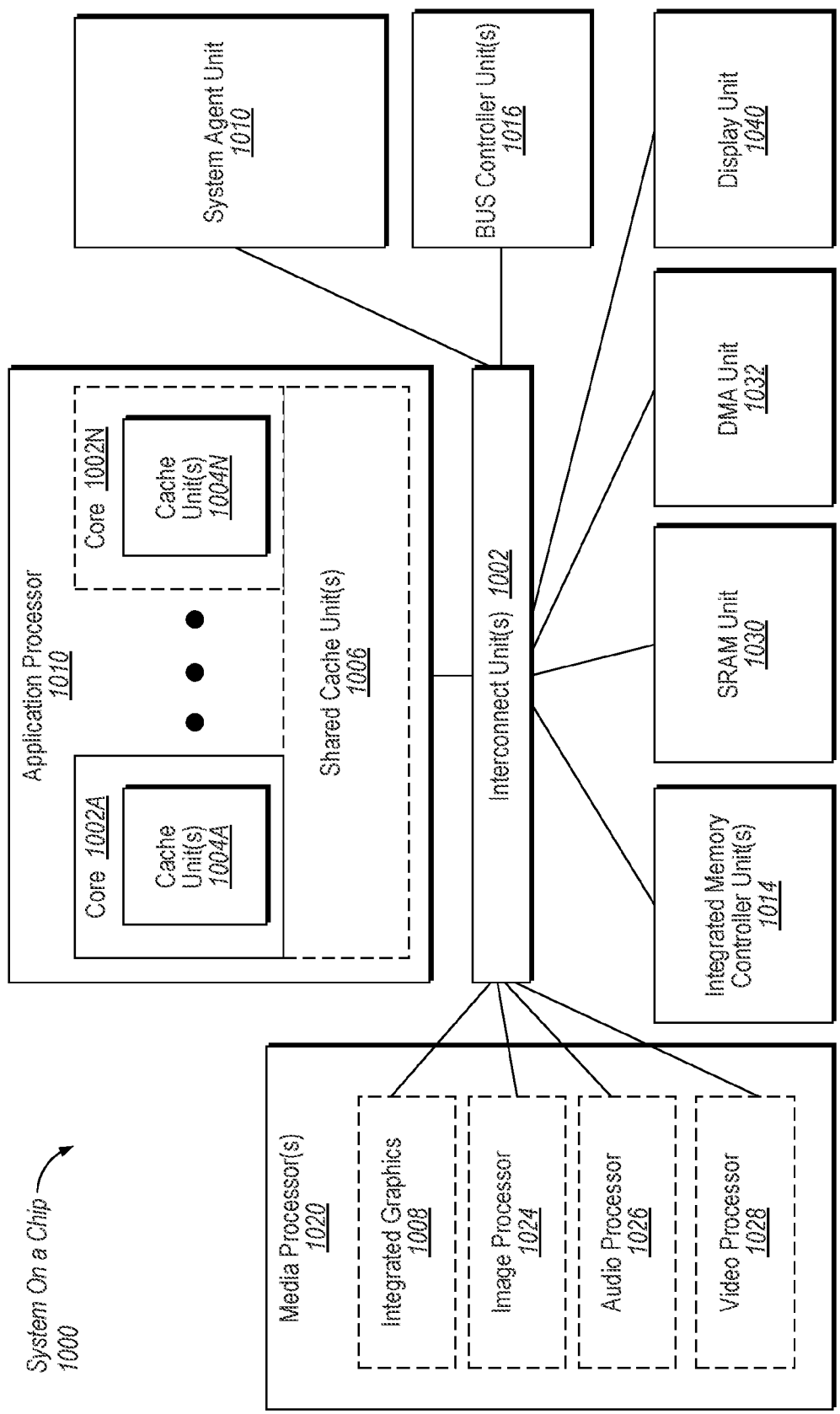
FIG. 12 is a block diagram illustrating a System-on-a-Chip (SoC) in which an embodiment of the disclosure may be used.

Embodiments may be implemented in many different system types. FIG. 12 is a block diagram of a SoC 1000 in accordance with an embodiment of the disclosure. Dashed lined boxes are optional features on more advanced SoCs. In FIG. 12, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set of one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a PMU for implementing the PASID translation unit 180 as described in embodiments to implement techniques for supporting process address space identifier virtualization using hardware paging hint functionality as described above.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogeneous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 13:
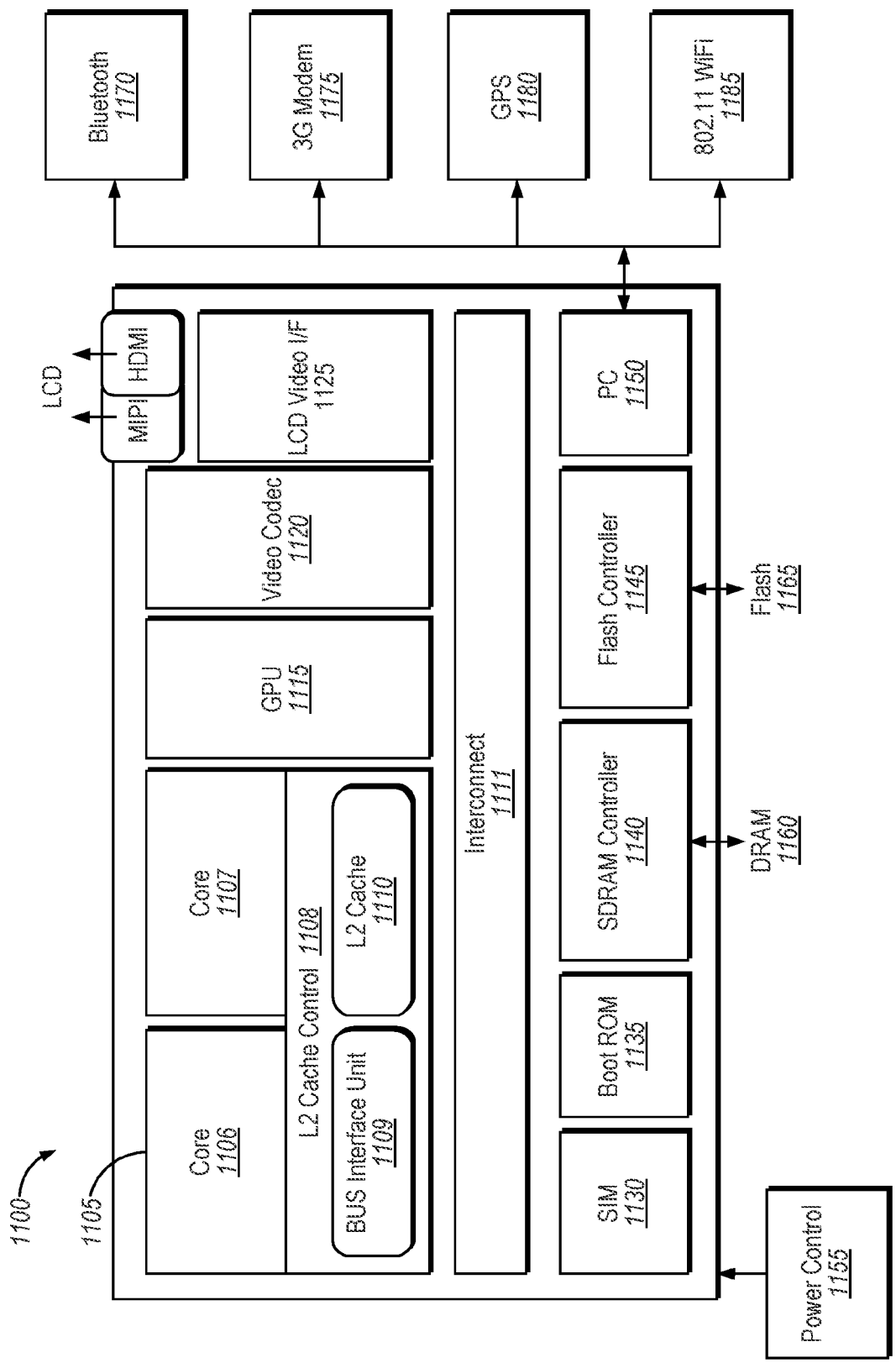
FIG. 13 is a block diagram illustrating a SoC design in which an embodiment of the disclosure may be used.

FIG. 13 is a block diagram of an embodiment of a system on-chip (SoC) design in accordance with the disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement techniques for supporting process address space identifier virtualization using hardware paging hint functionality as described above. as described in embodiments herein.

Interconnect 1110 provides communication channels to the other components, such as a Subscriber Identity Module (SIM) 1130 to interface with a SIM card, a boot ROM 1140 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 14:
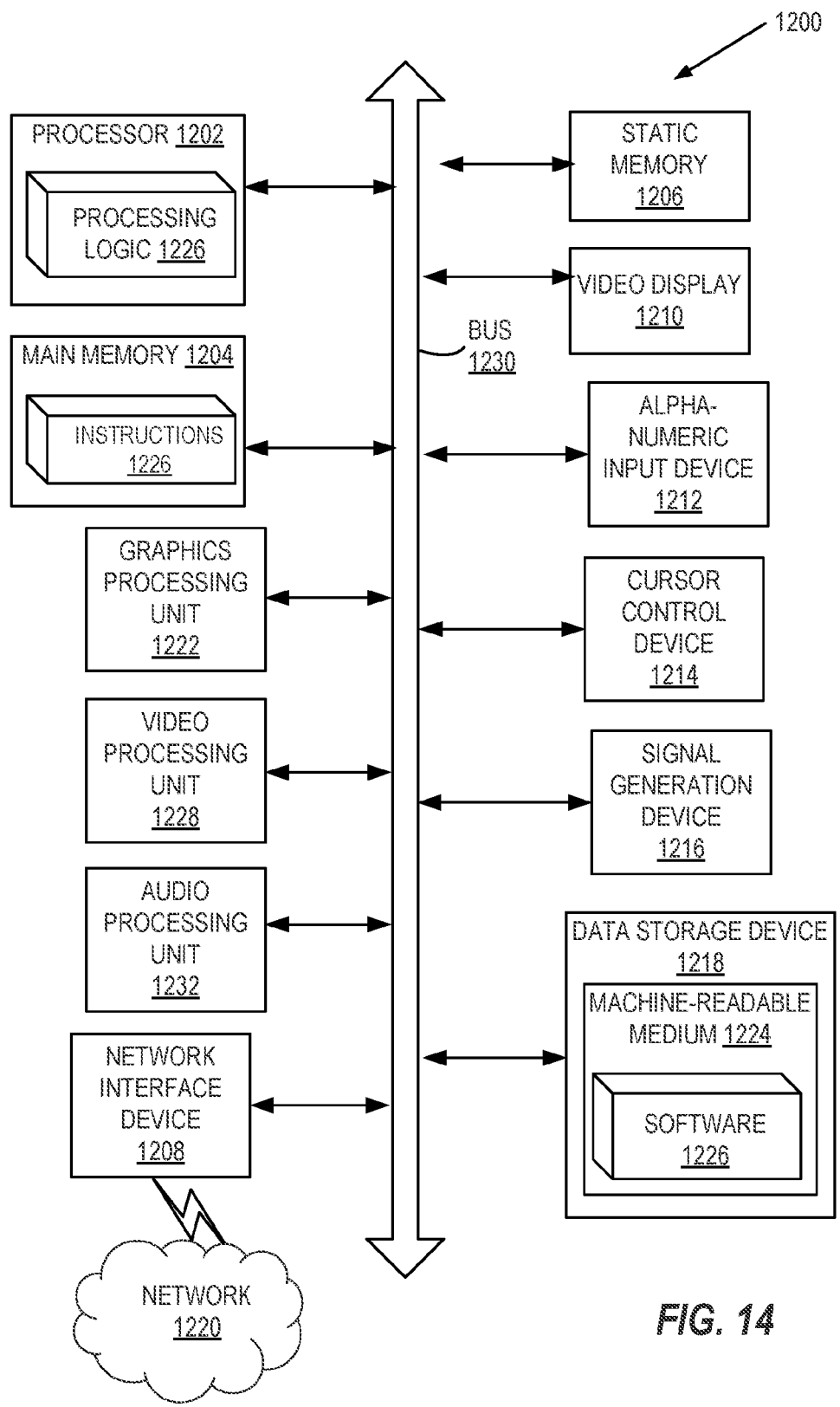
FIG. 14 illustrates a block diagram illustrating a computer system in which an embodiment of the disclosure may be used.

FIG. 14 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application-specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. In one embodiment, processing device 1202 is the same as processor architecture 100 described with respect to FIG. 1 that implements techniques for supporting process address space identifier virtualization using hardware paging hint functionality as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a non-transitory machine-accessible storage medium 1224 on which is stored software 1226 implementing any one or more of the methodologies of functions described herein, such as implementing address space identifier management in complex input/output virtualization environments on threads in a processing device, such as processing device 100 of FIG. 1, as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The non-transitory machine-readable storage medium 1224 may also be used to store instructions 1226 implementing the PASID translation unit 180 on threads in a processing device such as described with respect to processing device 100 in FIG. 1, and/or a software library containing methods that call the above applications. While the non-transitory machine-accessible storage medium 1224 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 includes a processing device comprising: a processing core; and a translation circuit coupled to the processing core, the translation circuit to: receive a workload instruction from a guest application being executed by the processing device, wherein the workload instruction comprises an untranslated guest process address space identifier (gPASID), a workload for an input/output (I/O) target device, and an identifier of a submission register on the I/O target device; access a paging data structure (PDS) associated with the guest application to retrieve a page table entry corresponding to the gPASID and the identifier of the submission register; determine a value of an I/O hint bit of the page table entry corresponding to the gPASID and the identifier of the submission register; responsive to determining that the I/O hint bit is set to a pre-defined value indicating that PASID translation is to be bypassed, keep the untranslated gPASID in the workload instruction; and provide the workload instruction to a work queue of the I/O target device.

Example 2 is a processing device of example 1, wherein the gPASID of the workload instruction is associated with a peripheral component interconnect (PCI) endpoint device interface of the I/O target device.

Example 3 is a processing device of example 1, wherein the I/O hint bit of the page table entry corresponding to the gPASID is an I/O hint associated with a register of the I/O target device.

Example 4 is a processing device of example 3, wherein the register of the I/O target device corresponds to a shared workload queue (SWQ) associated with the I/O target device.

Example 5 is a processing device of example 1, wherein the paging data structure comprises a two-level paging structure.

Example 6 is a processing device of example 5, wherein the two-level paging structure comprises an Extended Page Table (EPT).

Example 7 is a method comprising: receiving, by a processing device, a workload instruction from a guest application being executed by the processing device, wherein the workload instruction comprises an untranslated guest process address space identifier (gPASID), a workload for an input/output (I/O) target device, and an identifier of a submission register on the I/O target device; accessing, by the processing device, a paging data structure (PDS) associated with the guest application to retrieve a page table entry corresponding to the gPASID and the identifier of the submission register; determining, by the processing device, a value of an I/O hint bit of the page table entry corresponding to the gPASID and the identifier of the submission register; responsive to determining that the I/O hint bit is set to a pre-defined value indicating that PASID translation is to be performed: translating, by the processing device, the untranslated gPASID to a host process address space identifier (hPASID), and replacing, by the processing device, the gPASID in the workload instruction with the translated hPASID; and providing, by the processing device, the workload instruction to a work queue of the I/O target device.

Example 8 is a method of example 7, wherein the hPASID of the workload instruction is associated with an assignable device interface (ADI) of the I/O target device.

Example 9 is a method of example 8, wherein the workload instruction is submitted to the I/O target device on a shared workload queue (SWQ) of the I/O target device.

Example 10 is a method of example 7, wherein responsive to determining that the translation of the untranslated PASID is not successful, generating an alert to cause an exit event at the guest application.

Example 11 is a method of example 7, wherein, translating the untranslated gPASID to the translated hPASID further comprises: accessing a data structure associated with the processing device; indexing, using the untranslated gPASID, the data structure to identify a translation table; and identifying, using the translation table, an address pointer pointing to the translated hPASID.

Example 12 is a method of example 11, wherein the translation table is implemented in a virtual machine control structure (VMCS).

Example 13 is a method of example 7, wherein the providing the workload instruction to the work queue of the I/O target device is to execute the workload based in part on at least the translated hPASID.

Example 14 is a system comprising: a hardware input/output (I/O) memory management unit (IOMMU); and a processing device, operatively coupled to the IOMMU, to: receive a workload instruction from a guest application being executed by the processing device, wherein the workload instruction comprises an untranslated guest process address space identifier (gPASID), a workload for an input/output (I/O) target device, and an identifier of a submission register on the I/O target device; access a paging data structure (PDS) associated with the guest application to retrieve a page table entry corresponding to the gPASID and the identifier of the submission register; determine a value of an I/O hint bit of the page table entry corresponding to the gPASID and the identifier of the submission register; responsive to determining that the I/O hint bit is set to a pre-defined value indicating that PASID translation is to be bypassed, keep the untranslated gPASID in the workload instruction; and provide the workload instruction to a work queue of the I/O target device.

Example 15 is a system of example 14, wherein the gPASID of the workload instruction is associated with an assignable device interface (ADI) of the I/O target device.

Example 16 is a system of example 14, wherein the I/O hint bit of the page table entry corresponding to the gPASID is associated with a register of the I/O target device.

Example 17 is a system of example 16, wherein the register of the I/O device corresponds to a shared workload queue (SWQ) associated with the I/O target device.

Example 18 is a system of example 14, wherein the paging data structure comprises an Extended Page Table (EPT).

Example 19 is a system of example 18, wherein the EPT comprises a hardware paging hint corresponding to the I/O hint bit of the page table entry.

Example 20 is a system of example 14, wherein to provide the workload instruction to the work queue of the I/O device is to execute the workload based in part on at least the untranslated gPASID.

Example 21 is a non-transitory computer-readable medium comprising instructions that, when executed by a processing device, causes the processing device to: receive a workload instruction from a guest application being executed by the processing device, wherein the workload instruction comprises an untranslated guest process address space identifier (gPASID), a workload for an input/output (I/O) device, and an identifier of a submission register on the I/O target device; access a paging data structure (PDS) associated with the guest application to retrieve a page table entry corresponding to the gPASID and the identifier of the submission register; determine a value of an I/O hint bit of the page table entry corresponding to the gPASID and the identifier of the submission register; responsive to determining that the I/O hint bit is set to a pre-defined value indicating that PASID translation is to be bypassed, keep the untranslated gPASID in the workload instruction; and provide the workload instruction to a work queue of the I/O device.

Example 22 is non-transitory computer-readable medium of example 21, wherein the gPASID of the workload instruction is associated with a peripheral component interconnect (PCI) endpoint device interface of the I/O target device.

Example 23 is a non-transitory computer-readable medium of example 21, wherein the I/O hint bit of the page table entry corresponding to the gPASID is associated with a register of the I/O device.

Example 24 is a non-transitory computer-readable medium of example 23, wherein the register of the I/O device corresponds to a shared workload queue (SWQ) associated with the I/O device.

Example 25 is a non-transitory computer-readable medium of example 21, wherein the paging data structure comprises an Extended Page Table (EPT).

Example 26 is a non-transitory computer-readable medium of example 25, wherein the EPT comprises a hardware paging hint corresponding to the I/O hint bit of the page table entry.

Example 27 is an apparatus comprising: a means to receive a workload instruction from a guest application being executed by the processing device, wherein the workload instruction comprises an untranslated guest process address space identifier (gPASID), a workload for an input/output (I/O) device, and an identifier of a submission register on the I/O target device; a means to access a paging data structure (PDS) associated with the guest application to retrieve a page table entry corresponding to the gPASID and the identifier of the submission register; a means to determine a value of an I/O hint bit of the page table entry corresponding to the gPASID and the identifier of the submission register; responsive to determining that the I/O hint bit is set to a pre-defined value indicating that PASID translation is to be bypassed, a means to keep the untranslated gPASID in the workload instruction; and a means to provide the workload instruction to a work queue of the I/O target device.

Example 28 is an apparatus of example 27, wherein the gPASID of the workload instruction is associated with an assignable device interface (ADI) of the I/O device.

Example 29 is an apparatus of example 27, wherein the I/O hint bit of the page table entry corresponding to the gPASID is associated with a register of the I/O device.

Example 30 is an apparatus of example 27, wherein the register of the I/O device corresponds to a shared workload queue (SWQ) associated with the I/O device.

Example 31 is an apparatus of example 27, wherein the paging data structure comprises an Extended Page Table (EPT).

Example 32 is an apparatus of example 27, wherein the EPT comprises a hardware paging hint corresponding to the I/O hint bit of the page table entry.

Example 33 is an apparatus of example 27, wherein the means to provide the workload instruction to the work queue of the I/O device comprises a means to execute the workload based in part on at least the untranslated gPASID.

While the disclosure has been described respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, values or portions of values may represent states. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
a processing core; and
a translation circuit coupled to the processing core, the translation circuit to:
receive a workload instruction from a guest application being executed by the processing device, wherein the workload instruction comprises an untranslated guest process address space identifier (gPASID), a workload for an input/output (I/O) target device, and an identifier of a submission register on the I/O target device;
access a paging data structure (PDS) associated with the guest application to retrieve a page table entry corresponding to the gPASID and the identifier of the submission register;
determine a value of an I/O hint bit of the page table entry corresponding to the gPASID and the identifier of the submission register;
responsive to determining that an I/O hint bit of the page table entry is set to a pre-defined value indicating that gPASID translation is to be bypassed, keep the untranslated gPASID in the workload instruction; and
provide the workload instruction to a work queue of the I/O target device.

2. The processing device of claim 1, wherein the gPASID of the workload instruction is associated with a peripheral component interconnect (PCI) endpoint device interface of the I/O target device.

3. The processing device of claim 1, wherein access a paging data structure further comprises access a page table cache to retrieve a page table entry corresponding to the gPASID and the identifier of the submission register.

4. The processing device of claim 3, wherein the submission register of the I/O device corresponds to a shared workload queue (SWQ) associated with the I/O target device.

5. The processing device of claim 1, wherein the paging data structure comprises a two-level paging structure.

6. The processing device of claim 1, wherein the paging data structure comprises an Extended Page Table (EPT).

7. A method comprising:
receiving, by a processing device, a workload instruction from a guest application being executed by the processing device, wherein the workload instruction comprises an untranslated guest process address space identifier (gPASID), a workload for an input/output (I/O) target device, and an identifier of a submission register on the I/O target device;
accessing, by the processing device, a paging data structure (PDS) associated with the guest application to retrieve a page table entry corresponding to the gPASID and the identifier of the submission register;
determining, by the processing device, a value of an I/O hint bit of the page table entry corresponding to the gPASID and the identifier of the submission register;
responsive to determining that the I/O hint bit is set to a pre-defined value indicating that gPASID translation is to be performed:
translating, by the processing device, the untranslated gPASID to a host process address space identifier (hPASID), and
replacing, by the processing device, the gPASID in the workload instruction with the translated hPASID; and
providing, by the processing device, the workload instruction to a work queue of the I/O target device.

8. The method of claim 7, wherein the hPASID of the workload instruction is associated with an assignable device interface (ADI) of the I/O target device.

9. The method of claim 8, wherein the workload instruction is submitted to the I/O device on a shared workload queue (SWQ) of the I/O target device.

10. The method of claim 7, further comprising:
responsive to determining that the translation of the untranslated gPASID is not successful, generating an alert to cause an exit event at the guest application.

11. The method of claim 7, wherein translating the untranslated gPASID to the translated hPASID further comprises:
accessing a first-level translation data structure associated with the processing device;
indexing, using the untranslated gPASID, the first-level translation data structure to identify a second-level translation table; and
identifying, using the second-level translation table, an address pointer pointing to the translated hPASID.

12. The method of claim 11, wherein the second-level translation table is implemented in a virtual machine control structure (VMCS).

13. The method of claim 7, wherein the providing the workload instruction to the work queue of the I/O target device is to execute the workload based in part on at least the translated hPASID.

14. A system comprising:
a hardware input/output (I/O) memory management unit (IOMMU); and
a processing device, operatively coupled to the IOMMU, to:
receive a workload instruction from a guest application being executed by the processing device, wherein the workload instruction comprises an untranslated guest process address space identifier (gPASID), a workload for an input/output (I/O) target device, and an identifier of a submission register on the I/O target device;
access a paging data structure (PDS) associated with the guest application to retrieve a page table entry corresponding to the gPASID and the identifier of the submission register;
determine a value of an I/O hint bit of the page table entry corresponding to the gPASID and the identifier of the submission register;
responsive to determining that the I/O hint bit is set to a pre-defined value indicating that gPASID translation is to be bypassed, keep the untranslated gPASID in the workload instruction; and
provide the workload instruction to a work queue of the I/O target device.

15. The system of claim 14, wherein the gPASID of the workload instruction is associated with an assignable device interface (ADI) of the I/O target device.

16. The system of claim 14, wherein the I/O hint bit of the page table entry corresponding to the gPASID is a hardware I/O hint associated with a register of the I/O target device.

17. The system of claim 16, wherein the register of the I/O device corresponds to a shared workload queue (SWQ) associated with the I/O target device.

18. The system of claim 14, wherein the paging data structure comprises an Extended Page Table (EPT).

19. The system of claim 14, wherein access a paging data structure further comprises access a page table cache to retrieve a page table entry corresponding to the gPASID and the identifier of the submission register.

20. The system of claim 14, wherein to provide the workload instruction to the work queue of the I/O target device comprises executing the workload based in part on the untranslated gPASID.

* * * * *